United States Patent
Lichtenhan et al.

(10) Patent No.: US 6,972,312 B1
(45) Date of Patent: Dec. 6, 2005

(54) PROCESS FOR THE FORMATION OF POLYHEDRAL OLIGOMERIC SILSESQUIOXANES

(75) Inventors: Joseph D. Lichtenhan, San Juan Capistrano, CA (US); Joseph J. Schwab, Huntington Beach, CA (US); Yi-Zong An, Fountain Valley, CA (US); William Reinerth, Westminster, CA (US); Michael J. Carr, Fountain Valley, CA (US); Frank J. Feher, Costa Mesa, CA (US); Raquel Terroba, Irvine, CA (US); Qibo Liu, Irvine, CA (US)

(73) Assignee: Hybrid Plastics LLC, Fountain Valley, CA (US)

( * ) Notice: Subject to any disclaimer, the term of this patent is extended or adjusted under 35 U.S.C. 154(b) by 0 days.

(21) Appl. No.: 09/631,892

(22) Filed: Aug. 4, 2000

Related U.S. Application Data

(60) Provisional application No. 60/147,435, filed on Aug. 4, 1999.

(51) Int. Cl.$^7$ .............................................. C08G 77/06
(52) U.S. Cl. ............................ 528/14; 528/21; 528/23; 528/31; 528/33; 556/450; 556/455; 556/467; 556/469; 525/474; 525/477
(58) Field of Search ............................ 528/14, 16, 21, 528/23, 33; 556/450, 455, 467, 469; 525/474, 477

(56) References Cited

U.S. PATENT DOCUMENTS

| | | | |
|---|---|---|---|
| 4,483,107 A | * 11/1984 | Tomoyori et al. | ......... 51/281 R |
| 4,513,132 A | * 4/1985 | Shoji et al. | ............. 528/21 |
| 4,946,921 A | * 8/1990 | Shirata et al. | ............. 528/39 |
| 5,047,491 A |   9/1991 | Saho et al. | ............. 528/18 |
| 5,412,053 A |   5/1995 | Lichtenhan et al. | ........ 528/9 |
| 5,484,867 A |   1/1996 | Lichtenhan et al. | ........ 528/9 |
| 5,589,562 A |  12/1996 | Lichtenhan et al. | ........ 528/9 |
| 5,830,950 A | * 11/1998 | Katsoulis et al. | ......... 525/477 |
| 6,245,926 B1 | * 6/2001 | Charrin et al. | ............ 556/469 |
| 6,770,724 B1 | * 8/2004 | Lichtenhan et al. | ........ 528/14 |

FOREIGN PATENT DOCUMENTS

EP  0624591  11/1994  ............. C07F/7/08

OTHER PUBLICATIONS

Marsmann et al., Cage–rearrangement of silsesquioxanes, Polyhedron, vol. 16, No. 19, pp. 3357–3361, 1997.*

* cited by examiner

Primary Examiner—Jeffrey B. Robertson
(74) Attorney, Agent, or Firm—David Jaffer; Pillsbury Winthrop Shaw Pittman LLP

(57) ABSTRACT

Three processes for the manufacture of polyhedral oligomeric silsesquioxanes (POSS) which utilize the action of bases that are capable of either attacking silicon or any compound that can react with a protic solvent (e.g. ROH, $H_2O$ etc.) and generate hydroxide $[OH]^-$, alkoxide $[RO]^-$, etc. The first process utilizes such bases to effectively redistribute the silicon-oxygen frameworks in polymeric silsesquioxanes $[RSiO_{1.5}]_{2 \infty}$ where $\infty = 1-1,000,000$ or higher into POSS nanostructures of formulas $[(RSiO_{1.5})_n]\Sigma\#$, homoleptic, $[(RXSiO_{1.5})_n]\Sigma\#$, functionalized homoleptic, $[(RSiO_{1.5})_m(R'SiO_{1.5})_n]\Sigma\#$, heteroleptic, and $\{(RSiO_{1.5})_m(RXSiO_{1.0})_n\}\Sigma\#$, functionalized heteroleptic nanostructures. The second process utilizes base to aid in the formation of POSS nanostructures of formulas $[(RSiO_{1.5})_n]\Sigma\#$ homoleptic and $[(RSiO_{1.5})_m(R'SiO_{1.5})_n]\Sigma\#$ heteroleptic and $[(RSiO_{1.5})_m(RXSiO_{1.0})_n]\Sigma\#$ functionalized heteroleptic nanostructures from silanes $RSiX_3$ and linear or cyclic silsesquioxanes of the formula $RX_2Si-(OSiRX)_m-OSiRX_2$ where m=0–10, X=OH, Cl, Br, I, alkoxide OR, acetate OOCR, peroxide OOR, amine $NR_2$, isocyanate NCO, and R. The third process utilizes base to selectively ring-open the silicon-oxygen-silicon (Si—O—Si) bonds in POSS structures to form POSS species with incompletely condensed nanostructures. These processes also afford stereochemical control over X. The three processes result in new POSS species that can undergo additional chemical manipulations to ultimately be converted into POSS-species suitable for polymerization, grafting, or other desirable chemical reactions.

55 Claims, No Drawings

PROCESS FOR THE FORMATION OF POLYHEDRAL OLIGOMERIC SILSESQUIOXANES

This application claims benefit of 60/147,435 filed Aug. 4, 1999.

BACKGROUND OF THE INVENTION

This disclosure describes methods that enable the selective manipulation of the silicon-oxygen frameworks in polyhedral oligomeric silsesquioxane (POSS) cage molecules. It is desired to selectively manipulate the frameworks of POSS compounds because they are useful as chemical species that can be further converted or incorporated into a wide variety of chemical feed-stocks useful for the preparation of catalyst supports, monomers, polymers, and as solubilized forms of silica that can be used to replace fumed and precipitated silicas or in biological applications, and for surface modification. When incorporated into a polymeric material POSS can impart new and improved thermal, mechanical and physical properties to common polymeric materials.

A variety of POSS frameworks can be prepared in synthetically useful quantities via the hydrolytic condensation of alkyl- or aryl-trichlorosilanes. In most cases, however, hydrolytic condensation reactions of trifunctional organosilicon monomers afford complex polymeric resins and POSS molecules that are unsuitable for use in polymerization or grafting reactions because they do not possess the desired type or degree of reactive functionality. In light of the fact that many structurally well-defined silsesquioxane resins [$RSiO_{1.5}$] and POSS molecules of the homoleptic formula [($RSiO_{1.5}$)$_n$]# (where R=includes but is not limited to aliphatic, aromatic, olefinic or alkoxy groups and n=4–14) can be prepared in good to excellent yields from readily available organosilicon monomers, there are enormous incentives for developing a methodology capable of converting these POSS species into systems bearing functionalities that are more desirable for polymerization, grafting, catalysis, or compatibilization with common organic resins. Examples of such desirable functionalities include but are not limited to: silanes, silylhalides, silanols, silylamines, organohalides, alcohols, alkoxides, amines, cyanates, nitriles, olefins, epoxides, organoacids, esters, and strained olefins.

Prior art in the silsesquioxane field has taught processes for the chemical manipulation of the organic functionalities (substituents denoted by R) contained on the silicon oxygen frameworks of polyhedral oligomeric silsesquioxanes. While these methods are highly useful for varying the organic functionality (substituents) contained on POSS molecules they are not always amenable to low-cost manufacturing nor do they offer the ability to selectively cleave and or manipulate the silicon-oxygen frameworks of such compounds. Thus, these methods are of no utility for transforming the multitude of readily available and low cost silane, silicate, polysilsesquioxane (aka T-resins or T-type siloxanes) or POSS systems.

Prior art has reported that bases (e.g., NaOH, KOH, etc.) could be used to both catalyze the polymerization of POSS into lightly networked resins or to convert selected polysilsesquioxane resins into homoleptic polyhedral oligomeric silsesquioxane structures. Marsmann et al have more recently shown that a variety of bases can be used to redistribute smaller homoleptic POSS cages into larger sized homoleptic cages. (Marsmann, H. C. and Rikowski, E., Polyhedron, 1997, 16, 3357–3361). While there is precedent in the literature for treatment of silsesquioxanes and POSS systems with base, the previous art does not afford the selective manipulation of silicon-oxygen frameworks and the subsequent controlled production of POSS fragments, homoleptic POSS nanostructures, heteroleptic POSS nanostructures and functionalized heteroleptic POSS nanostructures. Furthermore, the prior art does not provide methods of producing POSS systems suitable for functionalization and subsequent polymerization or grafting reactions. This oversight in the prior art is reflective of the fact that the invention of POSS-based reagents, monomers and polymer technology has only recently been developed and consequently post-dates this prior art. Hence POSS compositions and processes relevant to the types of systems desired for POSS monomer/polymer technology were not envisioned in the prior art. Additionally the prior art does not demonstrate the action of bases on silane, silicate, or silsesquioxane feedstocks suitable for producing low-cost and high purity POSS systems.

In contrast to the prior art (see, e.g., Brown, J. F., Vogt, L. H., and P. I. Prescott J., Am. Chem. Soc. 1964, 86, 1120–1125; Marsmann, H. C. and Rilowski, E., Polyhedron, 1997, 16, 3357–3361), the processes taught here specifically enable the development of lower cost, high purity POSS systems bearing functionalities useful as derivitizable chemical reagents and feedstocks.

SUMMARY OF THE INVENTION

This invention teaches three processes that enable the manipulation and development of POSS compounds from readily available and low-cost silicon containing feedstocks. Examples of these low cost feedstocks include but are not limited to: Polysilsesquioxanes [$RSiO_{1.5}$]$_{2\mathrm{g}}$, homoleptic Polyhedral Oligomeric Silsesquioxanes (POSS) [($RSiO_{1.5}$)$_n$]$_{\Sigma\#}$, functionalized homoleptic POSS [($RSiO_{1.5}$)$_m$($RXSiO_{1.0}$)$_n$]$_{\Sigma\#}$, heteroleptic POSS [($RSiO_{1.5}$)$_m$($R'SiO_{1.5}$)$_n$]$_{\Sigma\#}$ functionalized heteroleptic POSS [($RSiO_{1.5}$)$_m$($R'SiO_{1.5}$)$_n$($RXSiO_{1.0}$)$_p$]$_{\Sigma\#}$ and polyhedral oligomeric silicates [($XSiO_{1.5}$)$_n$]$_{\Sigma\#}$, and POSS fragments [($RXSiO_{1.5}$)$_n$].

DEFINITION OF FORMULA REPRESENTATIONS FOR POSS NANOSTRUCTURES

For the purposes of explaining this invention's processes and chemical compositions the following definition for representations of nanostructural-cage formulas is made:
Polysilsesquioxanes are materials represented by the formula [$RSiO_{1.5}$]$_\infty$ where $\infty$=degree of polymerization within the material and R=organic substituent (H, cyclic or linear aliphatic or aromatic groups that may additionally contain reactive functionalities such as alcohols, esters, amines, ketones, olefins, ethers or halides). Polysilsesquioxanes may be either homoleptic or heteroleptic. Homoleptic systems contain only one type of R group while heteroleptic systems contain more than one type of R group.
POSS nanostructure compositions are represented by the formula:

[($RSiO_{1.5}$)$_n$]$_{\Sigma\#}$ for homoleptic compositions

[($RSiO_{1.5}$)$_m$($R'SiO_{1.5}$)$_n$]$_{\Sigma\#}$ for heteroleptic compositions

[($RSiO_{1.5}$)$_m$($RXSiO_{1.0}$)$_n$]$_{\Sigma\#}$ for functionalized Homoleptic compositions

[($RSiO_{1.5}$)$_m$($R'SiO_{1.5}$)($RXSiO_{1.0}$)$_p$]$_{\Sigma\#}$ for functionalized heteroleptic compositions ($XsiO_{1.5}$)$_n$]$_{\Sigma\#}$ for homoleptic silicate compositions.

In all of the above R is the same as defined above and X includes but is not limited to OH, Cl, Br, I, alkoxide (OR), acetate (OOCR), peroxide (OOR), amine (NR$_2$) isocyanate (NCO), and R. The symbols m and n refer to the stoichiometry of the composition. The symbol $\Sigma$ indicates that the composition forms a nanostructure and the symbol # refers to the number of silicon atoms contained within the nanostructure. The value for # is usually the sum of m+n. It should be noted that Σ# is not to be confused as a multiplier for determining stoichiometry, as it merely describes the overall nanostructural characteristics of the POSS system (aka cage size).

POSS Fragments are defined as structural subcomponents that can be assembled into POSS nanostructures and are represented by formula $[(RSiO_{1.5})_m(RXSiO_{1.0})_n]$. Note the symbols Σ# are absent as these fragments are not polyhedral nanostructures.

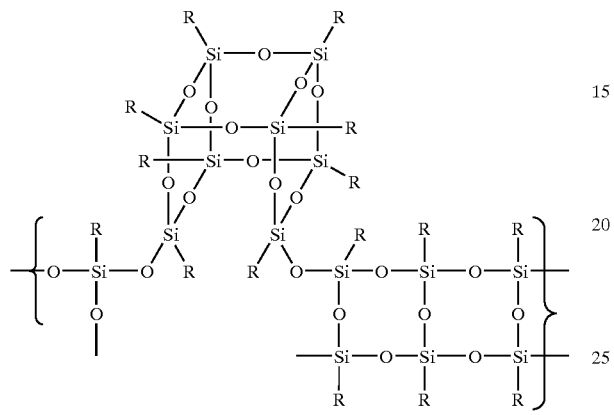

Example of Polysilsesquioxane Resins $[RSiO_{1.5}]_\infty$

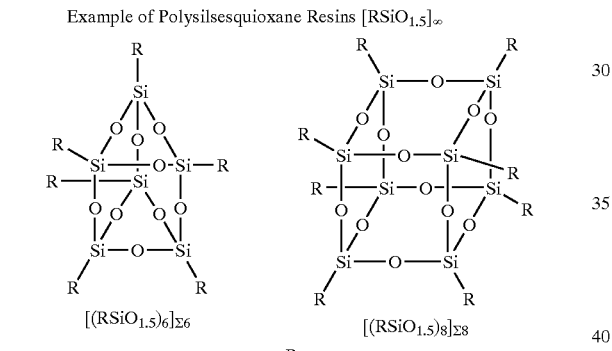

$[(RSiO_{1.5})_6]_{\Sigma 6}$     $[(RSiO_{1.5})_8]_{\Sigma 8}$

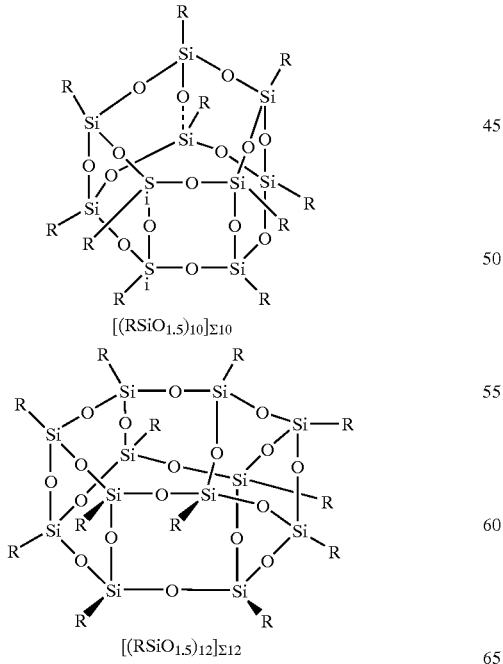

$[(RSiO_{1.5})_{10}]_{\Sigma 10}$ $[(RSiO_{1.5})_{12}]_{\Sigma 12}$

Examples of Homoleptic POSS Systems $[(RSiO_{1.5})]_{\Sigma\#}$

-continued

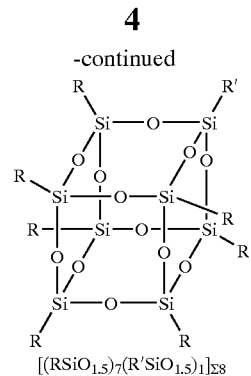

$[(RSiO_{1.5})_7(R'SiO_{1.5})_1]_{\Sigma 8}$

Example of a Heteroleptic POSS System $[(RSiO_{1.5})_m(R'SiO_{1.5})_n]_{\Sigma\#}$

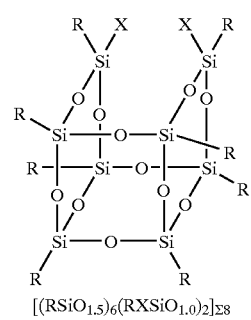

$[(RSiO_{1.5})_6(RXSiO_{1.0})_2]_{\Sigma 8}$

Example of a Functionalized Homoleptic POSS System $[(RSiO_{1.5})_m(RXSiO_{1.0})_n]_{\Sigma\#}$

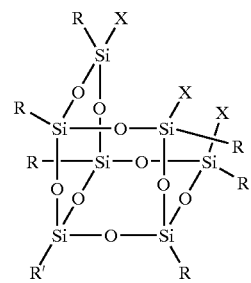

$[(RSiO_{1.5})_3(R'SiO_{1.5})_1(RXSiO_{1.0})_3]_{\Sigma 7}$

Example of a Functionalized Heteroleptic POSS System $[RSiO_{1.5})_m(R'SiO_{1.5})_n(RXSiO)_{1.0})_p]_{\Sigma\#}$

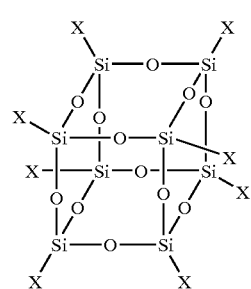

$[(XSiO_{1.5})_8]_{\Sigma 8}$

Example of a Polyhedral Oligomeric Silicate System $[(XSiO_{1.5})_n]_{\Sigma\#}$

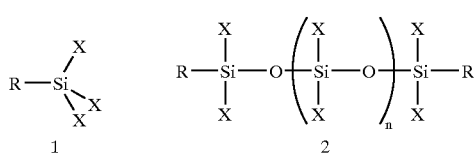

1     2

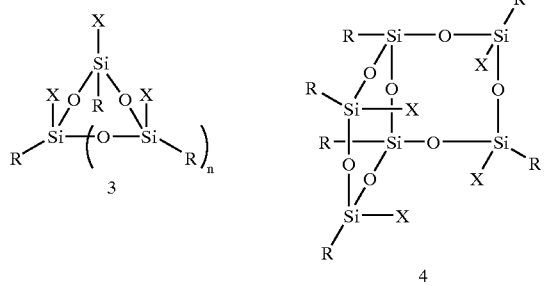

Fragment Example: RSiX$_3$ (1), [(RXSiO$_{0.5}$)$_n$] (2), [(RXSiO$_{1.0}$)$_n$] (3), [(RSiO$_{1.5}$)$_m$(RXSiO$_{1.0}$)$_n$] (4)

GENERAL PROCESS VARIABLES APPLICABLE TO ALL PROCESSES

As is typical with chemical processes there are a number of variables that can be used to control the purity, selectivity, rate and mechanism of any process. Variables influencing the process for the conversion of polysilsesquioxanes [RSiO$_{1.5}$]$_\infty$ into POSS structures [(RSiO$_{1.5}$)$_n$]$_{\Sigma\#}$, [(RSiO$_{1.5}$)$_m$(R'SiO$_{1.5}$)$_n$]$_{\Sigma\#}$, [(RSiO$_{1.5}$)$_m$(R'SiO$_{1.5}$)$_n$(RXSiO$_{1.0}$)$_p$]$_{\Sigma\#}$ [(RSiO$_{1.5}$)$_m$(RSiO$_{1.5}$)$_n$(RXSiO$_{1.0}$)$_p$]$_{\Sigma\#}$ include but are not be limited to the following: chemical class of base, silicon-oxygen ring size, composition type [RSiO$_{1.5}$]$_\infty$ (silsesquioxane), [(RSiO$_{1.5}$)$_n$(R$_2$SiO)$_n$]$_{\Sigma\#}$, (silsesquioxane-siloxane), [(RSiO$_{1.5}$)$_m$(XSiO$_{1.5}$)$_n$]$_{\Sigma\#}$ (silsesquioxane-silicate), effect of the organic substituents, process temperature, process solvent, process temperature, stoichiometry of base and the presence of a catalyst. Each of these variables is briefly discussed below.

Co-Reagent Promoters

Specific chemical agents can be utilized to promote or enhance the effectiveness of the bases utilized in the processes. Specifically, nucleophilic base mixtures that work in combined fashion to firstly solubilize the silsesquioxane and secondly promote formation of the POSS nanostructure. Examples of such systems may include but are not limited to KOR where OR is an alkoxide, RMgX which include all common Grignard reagents, or alkalihalides such as LiI, or any of a variety of molten or fused salt media. In a similar fashion co-bases such as [Me$_3$Sn][OH] and [Me$_4$Sb][OH] have been shown to promote chemical transformations of POSS systems yet have not been utilized as a co-reagent in the formation of POSS cages. Alternatively, electrophilic promoters such as zinc compounds, (i.e. ZnI$_2$, ZnBr$_2$, ZnCl$_2$, ZnF$_2$, etc.) aluminum compounds, (i.e. Al$_2$H$_6$, LiAlH$_4$, AlI$_3$, AlBr$_3$, AlCl$_3$, AlF$_3$, etc.) boron compounds including (i.e. RB(OH)$_2$, BI$_3$, BBr$_3$, BCl$_3$, BF$_3$, etc.) which are known to play important roles in the solubilization and ring-opening polymerization of cyclic silicones and in the ring-opening of polyhedral oligomeric silsesquioxanes.

Chemical Bases

The purpose of the base is to cleave the silicon-oxygen-silicon (Si—O—Si) bonds in the various silsesquioxane structures. The exact type of base, its hydration sphere, concentration, and solvent interactions all play important roles in the effectiveness of the base for cleaving the silicon-oxygen bonds. Proper understanding and control of conditions enable the selective cleavage and/or assembly of silsesquioxane, silicate, POSS, and POSS fragment systems in the desired manner. The base can also assist in the assembly of POSS fragments.

There are a wide range of bases that can be used in the processes and these include but are not limited to: hydroxide [OH]$^-$, organic alkoxides [RO]$^-$, carboxylates [RCOO]$^-$, amides [RNH]$^-$, carboxamides [RC(O)NR]$^-$, carbanions [R]$^-$ carbonate [CO$_3$]$^{-2}$, sulfate [SO$_4$]$^{-2}$, phosphate [PO$_4$]$^{-3}$, biphosphate [HPO$_4$]$^{-2}$, phosphorus ylides [R$_4$P]$^-$, nitrate [NO$_3$]$^-$, borate [B(OH)$_4$]$^{-1}$, cyanate [OCN]$^-$, fluoride [F]$^-$, hypochlorite [OCl]$^-$, silicate [SiO$_4$]$^{-4}$, stannate [SnO$_4$]$^{-4}$ basic metal oxides (e.g. Al$_2$O$_3$, CaO, ZnO etc.), amines R$_3$N and amine oxides R$_3$NO, and organomtallics (e.g. RLi, R$_2$Zn, R$_2$Mg, RMgX etc.). Furthermore, the processes taught here are not limited to the above-mentioned bases; rather any reagent can be employed which produces pH spanning the range from 7.1 to 14.

Alternatively mixtures of bases may also be utilized to carryout the process. One advantage of such an approach is that each of the bases in a given mixture can serve different functions. For example in a mixed base system one base can be used to cleave silicon-oxygen bonds or silicon-X bonds while a second base is used to assemble the POSS structure. Thus synergies can exist amongst several types of bases and these can be utilized to the advantage and refinement of these processes.

Silicon-Oxygen Ring Size, Ring Type and Cage Sizes

The processes discussed in this disclosure are not limited to the formation of specific sizes of POSS cages (i.e $\Sigma\#$ in [(RSiO$_{1.5}$)$_n$]$_{\Sigma\#}$). Similarly the processes should not be limited to specific types of silsesquioxanes (i.e. resins, cages or fragments). They can be carried out to manufacture POSS cages containing four to eighteen or more silicon atoms in the silicon-oxygen framework. It has been noted that the silicon-oxygen ring size contained within such POSS systems does however affect the rate at which cage silicon-oxygen ring opening can occur. For example rings containing three silicon atoms and three oxygen atoms as in Formula 1 appear to open faster than the larger rings containing 4 silicon atoms and 4 oxygen atoms. The relative rate for the opening of POSS silicon-oxygen rings appears to be six member rings with three silicon atoms>eight member rings with four silicon atoms>ten member rings with five silicon atoms>twelve member rings with six silicon atoms. Selective ring opening processes therefore can be controlled through the use of the appropriate base and knowledge of this information allows the user of these processes to control selective formation of POSS molecules.

Effect of the Organic Substituent, Process Solvents and Process Temperatures

The processes described in this disclosure are not limited to POSS systems bearing specific organic groups (defined as R) attached to the silicon atom of the silicon-oxygen ring systems. They are amenable to silsesquioxane feedstocks bearing a wide variety of organic groups (R=as previously defined) and functionalities (X=as previously defined). The organic substituent R does have a large effect on the solubility of both the final product and the starting POSS material. Therefore, it is envisioned that the different solubilities of the starting silsesquioxanes and POSS products can be used to facilitate the separation and purification of the final reaction products. We currently find no limitation of the process with respect to the type of solvent used and the processes have been carried out in common solvents including but not limited to ketones, ethers, dimethylsulfoxide, CCl$_4$, CHCl$_3$, CH$_2$Cl$_2$, fluorinated solvents, aromatics (halogenated and nonhalogenated), aliphatic (halogenated and nonhalogenated). Other processes can be carried out in supercritical fluids including but not limited to CO$_2$, H$_2$O, and propane. The variables of solvent type, POSS concentration, and process temperature should be utilized in the standard way to match the specific cage opening process to the equipment available. Preferred solvents for the processes are THF, MIK, and toluene. In many cases the solvent is an integral component of the process, which to enables the base to act on the specific silsesquioxane system, hence solvent effects greatly influence the degree of ionization of the base used in these processes.

Process I: Formation of POSS Systems from Polymeric Silsesquioxanes.

The current methods of preparing POSS molecules from the acid catalyzed condensation of alkyltrichlorosilanes (RSiCl$_3$) is inefficient in that it produces mixtures of POSS cage species homoleptic (POSS) [(RSiO$_{1.5}$)$_n$]$_{\Sigma\#}$, functionalized homoleptic POSS [(RSiO$_{1.5}$)$_m$(RXSiO$_{1.0}$)$_n$]$_{\Sigma\#}$, heteroleptic POSS [(RSiO$_{1.5}$)$_m$(R'SiO$_{1.5}$)$_n$]$_{\Sigma\#}$, functionalized heteroleptic POSS [(RSiO$_{1.5}$)$_m$(RXSiO$_{1.0}$)$_n$]$_{\Sigma\#}$ and polymeric silsesquioxanes [RSiO$_{1.5}$]$_\infty$. In some cases the undesired polymeric silsesquioxanes are produced in as much as 75% yield. It is therefore advantageous to develop a process that can efficiently convert [RSiO$_{1.5}$]∞ into desirable POSS nanostructures or into POSS fragments [(RXSiO$_{1.5}$)$_n$]. Such a process will serve to not only reduce the amounts of hazardous waste produced in such reactions but will also reduce the production costs for POSS systems.

The process developed utilize bases (as defined previously), in particular hydroxide bases (e.g. sodium hydroxide, potassium hydroxide, lithium hydroxide, benzyltrimethylammonium hydroxide, tetramethyl ammonium hyrdoxide etc) to convert polymeric silsesquioxanes [RSiO$_{1.5}$]$_\infty$ into homoleptic (POSS) [(RSiO$_{1.5}$)$_n$]$_{\Sigma\#}$, functionalized homoleptic POSS [(RSiO$_{1.5}$)$_n$(RXSiO$_{1.0}$)$_n$]$_{\Sigma\#}$, heteroleptic POSS [(RSiO$_{1.5}$)$_m$(R'SiO$_{1.5}$)$_n$]$_{\Sigma\#}$, and functionalized heteroleptic POSS [(RSiO$_{1.5}$)$_m$(R'XSiO$_{1.0}$)$_n$]$_{\Sigma\#}$.

In the current process polymeric silsesquioxane [RSiO$_{1.5}$]$_\infty$ is dissolved or suspended in a technical grade solvent such as acetone or methylisobutyl ketone, and subsequent addition of an aqueous or alcoholic solution of base is carried out with stirring. Sufficient base should be added to the reaction mixture so as to produce a basic solution (pH 7.1–14). The reaction mixture is stirred at room temperature for 3 hours followed by heating to reflux for an additional 3–12 hours. During this time the desired POSS cages generally precipitate from the reaction medium due to their insolubility in the reaction medium. This precipitation aids in the isolation of the desired products and ensures that the products (such as the functionalized POSS species) do not undergo further reaction. In some cases it is desirable to reduce the volume of solvent by distillation or by reduced pressure in order to increase product yields or to isolate soluble POSS products. The desired POSS product is collected by filtration or decantation and can be purified through exhaustive washing with water.

We have found that hydroxide [OH]$^-$ bases are highly effective at concentrations of 1–10 equivalents (the preferred range is 2–5 equivalents per silicon atom) per mole of silicon for the conversion of aliphatic and aromatic polysilsesquioxanes [RSiO$_{1.5}$]$_\infty$ into homoleptic (POSS) [(RSiO$_{1.5}$)$_n$]$_{\Sigma\#}$, functionalized homoleptic POSS [(RSiO$_{1.5}$)$_m$(RXSiO$_{1.0}$)$_n$]$_{\Sigma\#}$ heteroleptic POSS [(RSiO$_{1.5}$)$_m$(R'SiO$_{1.5}$)$_n$]$_{\Sigma\#}$, and functionalized heteroleptic POSS [(RSiO$_{1.5}$)$_m$(R'SiO$_{1.5}$)$_n$(RXSiO$_{1.0}$)$_p$]$_{\Sigma\#}$. Hydroxyl-bases are particularly effective for producing [(RSiO$_{1.5}$)$_m$(RXSiO$_{1.0}$)$_n$]$_{\Sigma\#}$ POSS species. We have found that milder bases such as acetate and carbonate are more effective at converting [RSiO$_{1.5}$]$_\infty$systems bearing vinyl or allyl groups. It is also recognized that the use of other co-reagents may be used to promote the formation of POSS species from this process.

Scheme 1

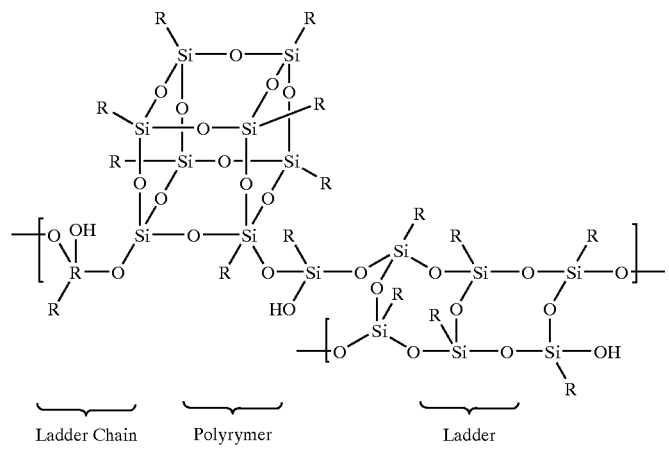

Ladder Chain    Polyrymer    Ladder

Polysilsesquioxane resins [RSiO$_{1.6}$]

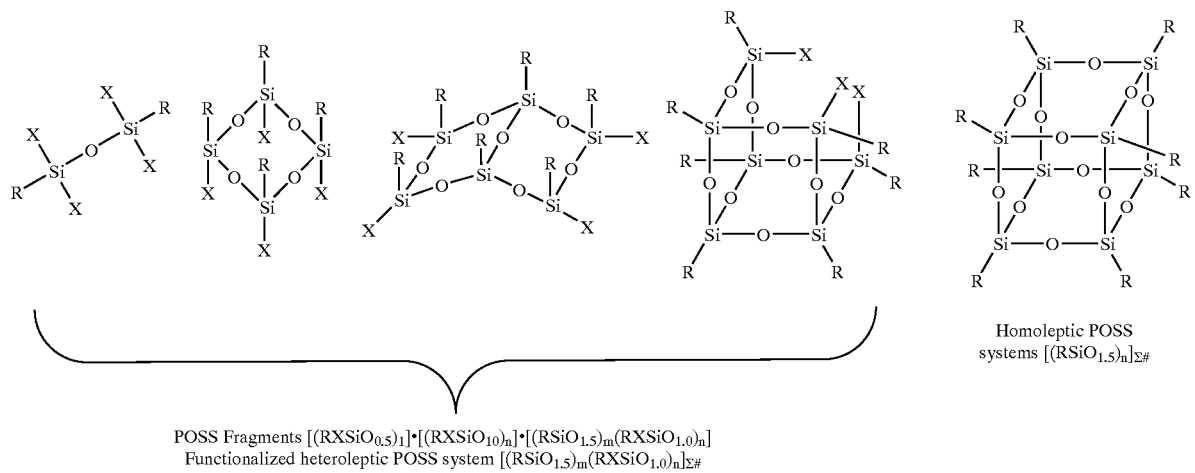

POSS Fragments [(RXSiO$_{0.5}$)$_1$]•[(RXSiO$_{1.0}$)$_n$]•[(RSiO$_{1.5}$)$_m$(RXSiO$_{1.0}$)$_n$]
Functionalized heteroleptic POSS system [(RSiO$_{1.5}$)$_m$(RXSiO$_{1.0}$)$_n$]$_{\Sigma\#}$ Homoleptic POSS systems [(RSiO$_{1.5}$)$_n$]$_{\Sigma\#}$ For the above reaction scheme (Scheme 1) the polymeric silsesquioxane resin is converted into either POSS fragments or nanostructured POSS cage species depending on the type of base and conditions employed. The conversion of polysilsesquioxanes [RSiO$_{1.5}$]$_\infty$ to POSS-species (homoleptic [(RSiO$_{1.5}$)$_n$]$_{\Sigma\#}$, functionalized homoleptic [(RSiO$_{1.5}$)$_m$(RXSiO$_{1.0}$)$_n$]$_{\Sigma\#}$, heteroleptic [(RSiO$_{1.5}$)$_m$(R'SiO$_{1.5}$)$_n$]$_{\Sigma\#}$ and functionalized heteroleptic [(RSiO$_{1.5}$)$_m$(R'SiO$_{1.5}$)$_n$(RXSiO$_{1.0}$)$_p$]$_{\Sigma\#}$ or into POSS-fragments [(RXSiO$_{1.5}$)$_n$] can be selectively controlled through manipulation of the process variables discussed above. The process can be conducted using a polysilsesquioxane resin which may contain only one type of R group to produce homoleptic [(RSiO$_{1.5}$)$_n$]$_{\Sigma\#}$ products. Alternatively the process can be carried out using polysilsesquioxane resins containing more than one type of R group or with mixtures of polysilsesquioxanes in which each contains different R groups to afford heteroleptic [(RSiO$_{1.5}$)$_m$(R'SiO$_{1.5}$)$_n$]$_{\Sigma\#}$ products. For the above reaction scheme (Scheme 1) in which mixtures of homoleptic POSS cages (i.e. R of one POSS cage≠ R of the second POSS cage) are substituted for the polysilsesquioxane resin the process effectively converts mixtures of homoleptically substituted POSS cages into heteroleptic POSS cages (functionalized and nonfunctionalized) that contain statistical distributions of different R groups per cage. In most cases the POSS fragments and various homo or heteroleptic nanostructured POSS species can be separated from one another through crystallization, or extractions by utilizing the differences in solubility between the reaction products and the starting silsesquioxane.

The purpose of the base in this process is to cleave silicon-oxygen bonds in the starting silsesquioxane and thereby allow for, as well as aid in the rearrangement and formation of the various POSS fragments, homoleptic and heteroleptic species. The strength of the base and the base-solvent-silsesquioxane interaction are critical factors, which enable control over the type of products formed in these reactions. For example, increasing the basicity of the medium affords the production of POSS fragments while less basic conditions coupled with exclusion of water promote the formation of nonfunctionalized POSS species. Formation of functionalized POSS systems are favored by carrying out the process at an intermediate pH with scarce amounts of water for shorter periods of time.

Process II: Reactions between POSS Systems and Silsesquioxane/Siloxane Fragments.

The process developed utilized bases (as defined previously) to convert fragments and functionalized POSS nanostructures [(RSiO$_{1.5}$)$_m$(RXSiO$_{1.0}$)$_n$]$_{\Sigma\#}$ into alternate functionalized POSS nanostructures [(RSiO$_{1.5}$)$_m$(RXSiO$_{1.0}$)$_n$]$_{\Sigma\#}$. In the process a POSS fragment is dissolved or suspended in acetone, benzene or alcoholic solvents after which a solution of base is added with stirring. In general the reaction conditions employed in this process are milder than those used in Process I and can utilize both hydroxide and nonhydroxide bases, while the molar ratio of base relative to silicon is 1:10 (with 1:1 or 1:2 ration being preferred). Scheme 2 below illustrates some examples of the conversion of POSS fragments into POSS cages.

Scheme 2

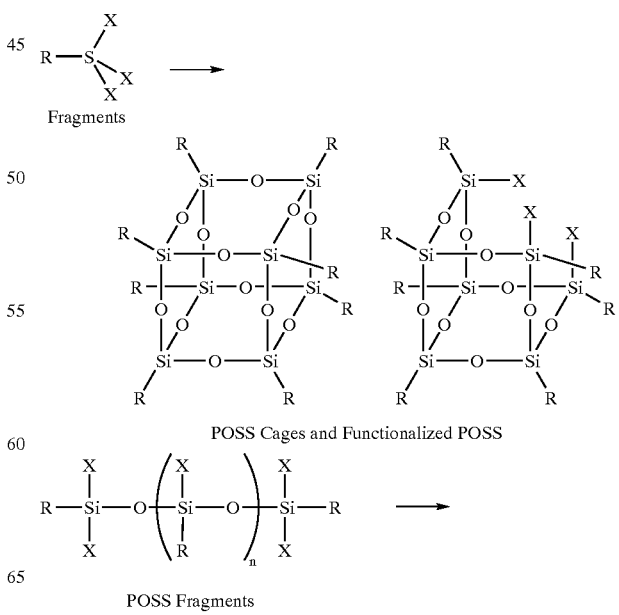

Fragments

POSS Cages and Functionalized POSS

POSS Fragments

-continued

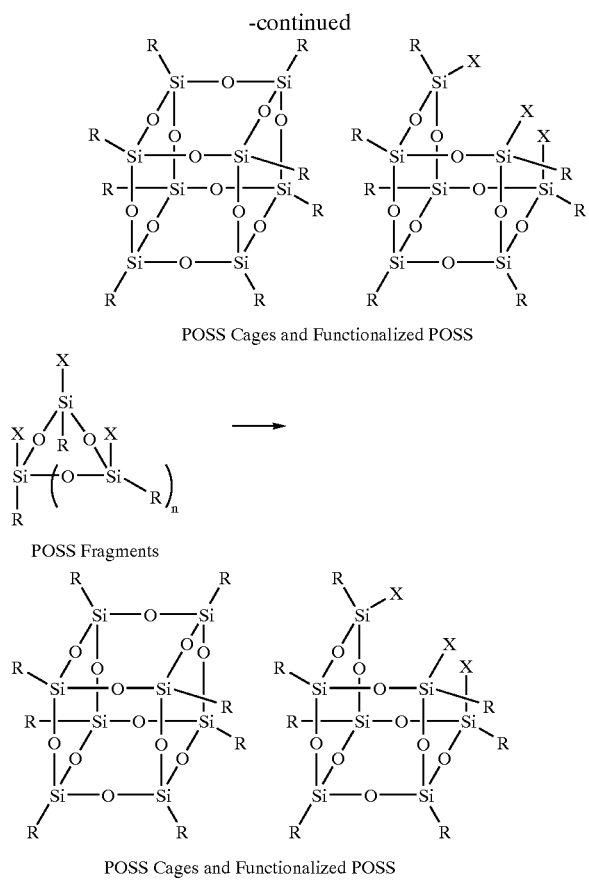

POSS Cages and Functionalized POSS

POSS Fragments

POSS Cages and Functionalized POSS

The purpose of the base in this process is to cleave silicon-oxygen bonds in the starting POSS fragments. The base may also aid in the assembly of POSS structures from the fragments. A number of different bases (as defined previously) can be used to convert POSS fragments into POSS compounds. The net reaction results in the assembly of POSS fragments into POSS nanostructures, having either homoleptic or heteroleptic composition. Additionally, the resulting POSS cages may contain functional groups (i.e. $[(RSiO_{1.5})_m(RXSiO_{1.0})_n]_{\Sigma\#}$ and $[(RSiO_{1.5})_m(R'SiO_{1.5})_n(RXSiO_{1.0})_p]_{\Sigma\#})$.

When mixtures of POSS fragments are utilized they are incorporated statistically into the POSS structure and their final composition is based on the stoichiometry of the starting POSS fragments. In some cases the statistical degree of substitution between these groups is governed by isomorphism resulting from the nearly identical topological shape of the R group (e.g. vinyl and ethyl). Isomorphic governance is often observed for closely related R groups (e.g. allyl and propyl etc.); however, on occasion the trend is not followed due to other factors such as rate of reaction, reagent addition, or solubility between various POSS fragments and products. For example the reaction of 1 equivalent of EthylundeconoateSi(OMe)$_3$ or VinylSi(OMe)$_3$ with 7 equivalents of MeSi(OMe)$_3$ results in a molecule of formula 2 of the composition $[(ViSiO_{1.5})_1(MeSiO_{1.5})_7]_{\Sigma 8}$ or $[(EthylundeconoateSiO_{1.5})_1(MeSiO_{1.5})_7]_{\Sigma 8}$ despite the topological dissimilarity between the R groups.

In many cases the desired homo or heteroleptic nanostructured POSS species can be separated from one another via crystallization, extraction or by utilizing differences in the solubilities of the products and the starting POSS fragments.

An extension of this process is the action of base on functionalized POSS nanonostructures (i.e. $[(RSiO_{1.5})_m(RXSiO_{1.0})_n]_{\Sigma\#}$ and $[(RSiO_{1.5})_m(R'SiO_{1.5})_n(RXSiO_{1.0})_p]_{\Sigma\#})$.

It should be noted that these systems are chemically similar to a POSS fragments in terms of their chemical composition. They are different however in their topology and physical properties such as melting point, solubility and volatility.

Scheme 3 illustrates actual reactions that use the conditions described in Process II as proof that the bases and conditions described in Process II are effective for the conversion of functionalized POSS cages (i.e. $[(RSiO_{1.5})_m(RXSiO_{1.0})_n]_{\Sigma\#}$ and $[(RSiO_{1.5})_m(R'SiO_{1.5})_n(RXSiO_{1.0})_p]_{\Sigma\#})$ to desired POSS structures. It should also be noted that in most cases this process results in an increase in the number of functionalities (X) on a POSS nanostructure while at the same time maintaining the original number of silicon atoms contained within the starting nanostructural framework. This can be desirable for a variety of subsequent synthetic product manipulations and derivations.

Scheme 3

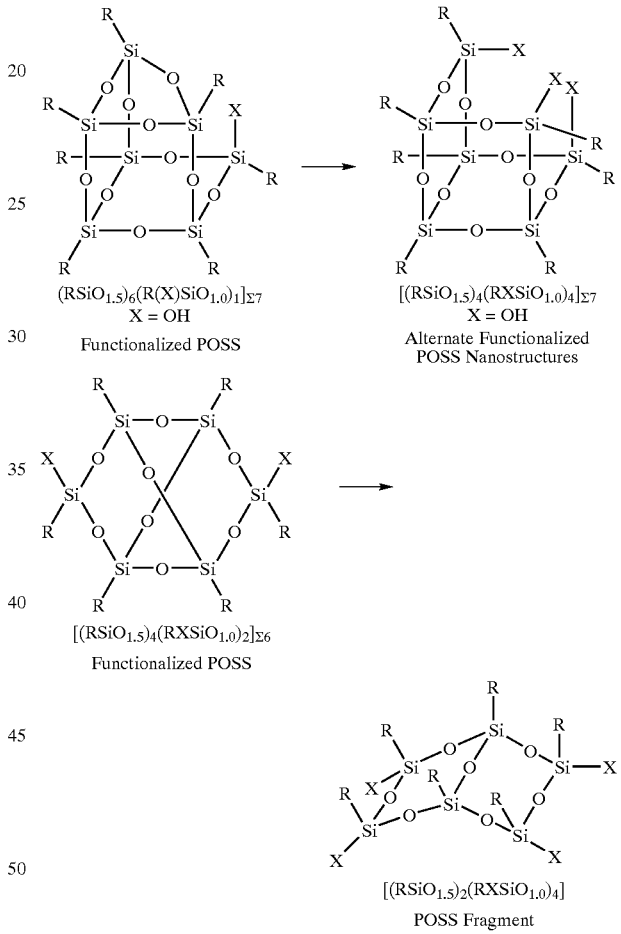

The first example in Scheme 3 illustrates the selectivity for the cleavage of 6 membered silicon-oxygen rings in the presence of 8 membered silicon-oxygen rings by the base, to afford the trifunctionalized POSS species. This reaction is driven by the release of greater ring strain energy from the cleavage of the 6 membered silicon-oxygen ring vs. cleavage of the 8 membered silicon-oxygen ring and is thermodynamically favorable. In the second example the energy of the twisted conformation is relieved upon cleavage to form a more open structure.

A final alternate of process II and one that is of great utility is that it can also allow for the incorporation of POSS fragments into existing POSS and POSS silicate nanostructures. This is a very important and useful aspect of this process because it allows for the expansion of both POSS and POSS silicate cage species. This is analogous to a carbon—carbon bond forming processes in organic systems. Hence this process can be utilized to prepare larger POSS nanostructures as well as POSS nanostructures having previously inaccessible sizes. Of particular importance is the use of this process to prepare nanostructures having odd as well as even numbers of silicon atoms.

Scheme 4

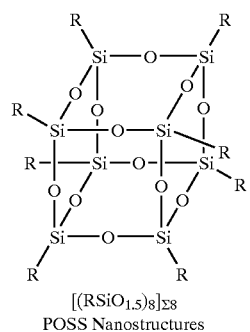

[(RSiO$_{1.5}$)$_8$]$_{\Sigma 8}$
POSS Nanostructures

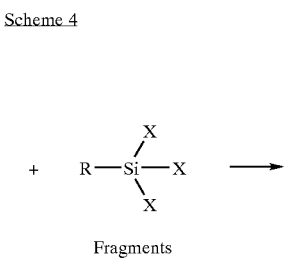

Fragments

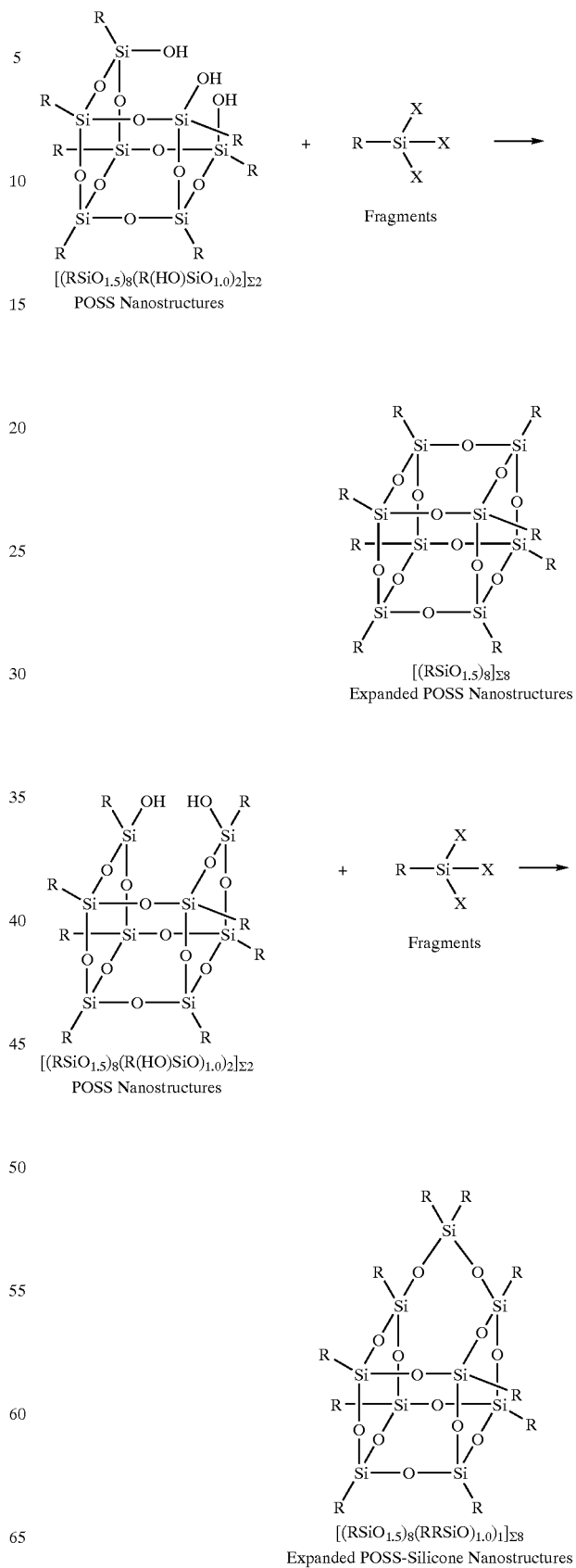

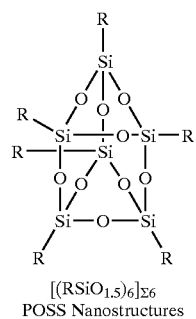

[(RSiO$_{1.5}$)$_6$]$_{\Sigma 6}$
POSS Nanostructures

+

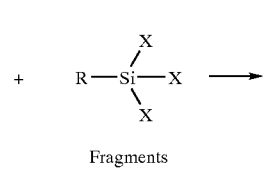

Fragments

→

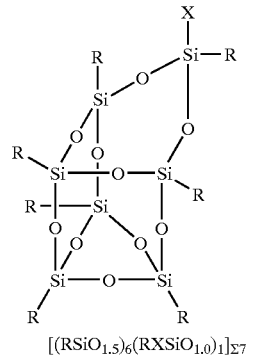

[(RSiO$_{1.5}$)$_6$(RXSiO$_{1.0}$)$_1$]$_{\Sigma 7}$
Expanded POSS Nanostructures

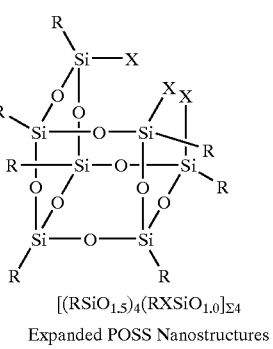

[(RSiO$_{1.5}$)$_4$(RXSiO$_{1.0}$)$_2$]$_{\Sigma 4}$
Expanded POSS Nanostructures

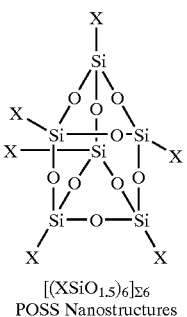

[(XSiO$_{1.5}$)$_6$]$_{\Sigma 6}$
POSS Nanostructures

+

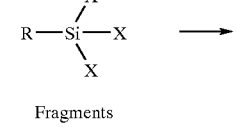

Fragments

→

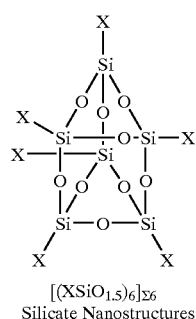

[(XSiO$_{1.5}$)$_6$]$_{\Sigma 6}$
Silicate Nanostructures

+

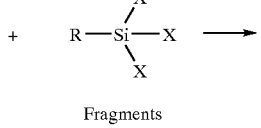

Fragments

→

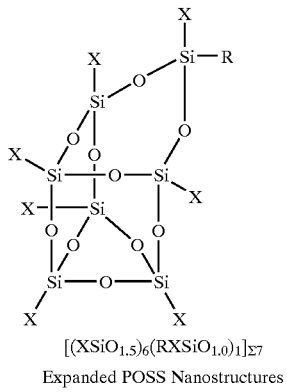

[(XSiO$_{1.5}$)$_6$(RXSiO$_{1.0}$)$_1$]$_{\Sigma 7}$
Expanded POSS Nanostructures

[(XSiO$_{1.5}$)$_8$(X$_2$SiO$_{1.0}$)$_2$(RXSiO$_{1.0}$)$_1$]$_{\Sigma 7}$
Expanded POSS-Silicate Nanostructures

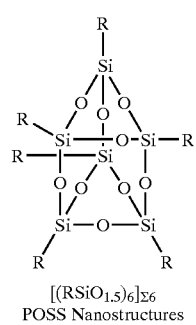

[(RSiO$_{1.5}$)$_6$]$_{\Sigma 6}$
POSS Nanostructures

+

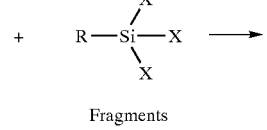

Fragments

→

Scheme 4 above illustrates examples of Silsesquioxanel-siloxane fragments being inserted into POSS cages. The net reaction in the examples shown in Scheme 4 is cleavage of an Si—O—Si bond in the POSS or POSS silicate nanostructure and insertion of the POSS fragment. This reaction results in the expansion of the silicon-oxygen ring in the POSS nanostructured product. Note that the ring expansion in these reactions is in some cases favored thermodynamically through relief of ring strain in the silsesquioxane starting material. For example, the reaction of 1 equivalent of Vinyl(OMe)$_3$ with [((c-C$_6$H$_{11}$)SiO$_{1.5}$)$_6$]$_{\Sigma 5}$ results in POSS molecule having the composition [((c-C$_6$H$_{11}$(SiO$_{1.5}$)$_4$(c-C$_6$H$_{11}$)(HO)SiO$_{1.0}$)$_2$(ViSiO$_{1.0}$)$_1$]$_{\Sigma 7}$.

Mixtures of bases may also be utilized to carryout the process. One advantage of such an approach is that the use of different types of base in combination could serve different functions. For example one base may be particularly useful for the cleavage of Si—X groups while the second base may function in the assembly of POSS fragments into POSS nanostructures. Synergistic effects between different types of base can also be expected.

Particularly important is the use of mixtures of POSS fragments (i.e. where R of one fragment≠ R of the other fragment) or POSS fragments having more than one type of R group. Use of mixed fragments or fragments having mixed R groups affords heteroleptic POSS species $[(RSiO_{1.5})_m(RSiO_{1.5})_n]_{\Sigma\#}$ which contain more than one type of R group. In general the POSS nanostructured products formed contain a statistical mixture of R which is determined by the stoichiometry of the starting fragments. As a result, numerous isomers are possible.

Process III: Selective Opening, Functionalization and Rearrangement of POSS Nanostructures This processes utilizes bases (as defined previously) and POSS nanostructures having homoleptic $[(RSiO_{1.5})_n]_{\Sigma\#}$ and heteroleptic $[(RSiO_{1.5})_m(R'SiO_{1.5})_n]_{\Sigma\#}$ compositions. The process allows for the conversion of low cost and easily produced unfunctionalized POSS nanostructures into more desirable functionalized POSS systems of the type $(RSiO_{1.5})_m(RXSiO_{1.0})_n]_{\Sigma\#}$. POSS nanostructures of the type $[(RSiO_{1.5})_m(RSiO_{1.0})_n]_{\Sigma\#}$ can be used as stand alone chemical reagents or further derivatized to provide a diverse array of other POSS nanostructures. This process provides an entirely new synthetic route for the preparation of very important and useful incompletely condensed trisilanol reagents $[(RSiO_{1.5})_4(RXSiO_{1.0})_3]_{\Sigma 7}$ in particular where X=OH.

Homoleptic POSS nanostructures $[(RSiO_{1.5})_n]_{\Sigma\#}$ are readily converted into POSS nanostructures having the formula $[(RSiO_{1.5})_m(RXSiO_{1.0})_n]_{\Sigma\#}$, as well as POSS fragments having the formula $RSiX_3$, $[(RXSiO_{0.5})_n]$, $[(RXSiO_{1.0})_n]$, or $[(RSiO_{1.5})_m(RXSiO_{1.0})_n]$ through the use of bases as shown in Scheme 5. Note that all possible geometric and stereochemical isomers for each product are not shown.

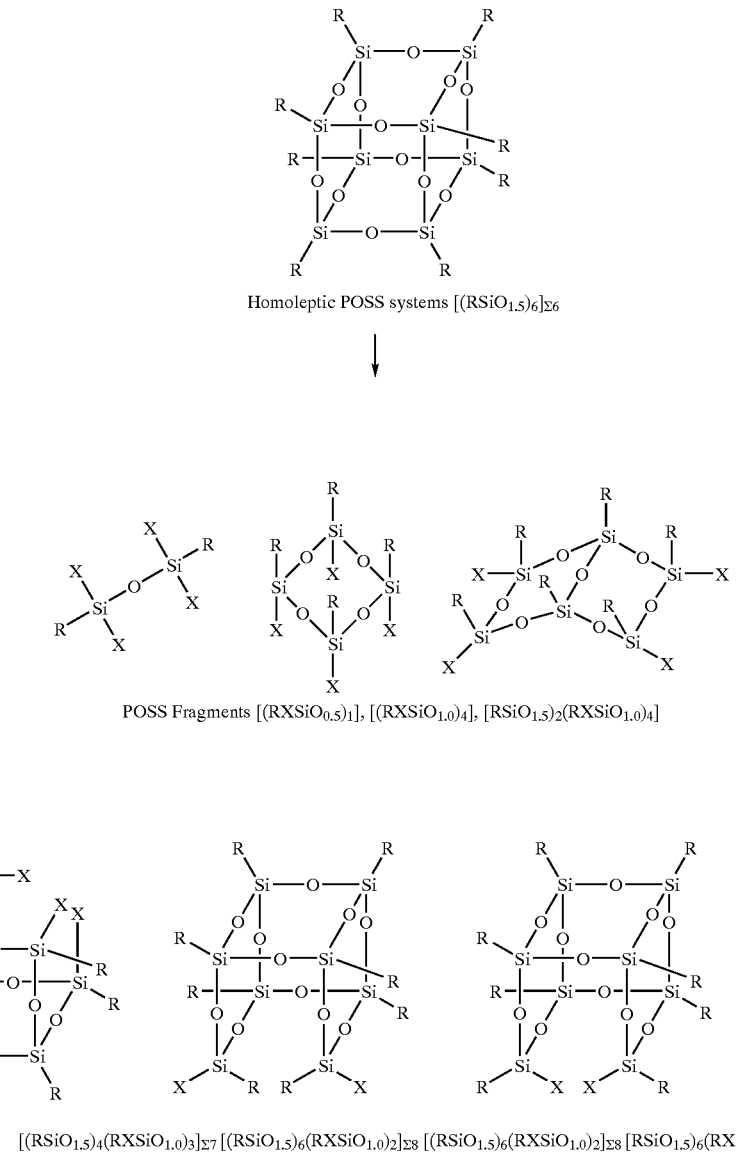

Scheme 5

Furthermore as a variation of this process it is possible to interconvert various sizes of POSS nanostructures. For example, with the proper addition of base $[(RSiO_{1.5})_6]_{\Sigma6}$ can be either cleaved into a smaller POSS fragments (e.g. $[RSiX_3]$, $[(RXSiO_{0.5})_n]$, $[(RXSiO_{1.0})_n]$, or $[(RSiO_{1.5})_m (RXSiO_{1.0})_n])$ or functionalized into heteroleptic POSS nanostructures of the same size (e.g. $[(RSiO_{1.5})_4(RXSiO_{1.0})_2]_{\Sigma6}$) or larger (e.g. $[(RSiO_{1.5})_4(RXSiO_{1.0})_3]_{\Sigma7}$) as shown in As a variation of the above it is recognized that this process can utilize mixtures and distributions of POSS cages as well as polyhedral oligomeric silicate species (e.g. $[((CH_3)_3SiO)SiO_{1.5}]_6)_{\Sigma6}$, $[((CH_3)_4NO)SiO_{1.5}]_6)_{\Sigma6}$, $[((CH_3)_3SiO)SiO_{1.5}]_8)_{\Sigma8}$, $[((CH_3)_4NO)SiO_{1.5}]_8)_{\Sigma8}$. In such cases the base effectively converts cages of several sizes into functionalized and nonfunctionalized heteroleptic POSS nanostructures as shown in Scheme 7. This represents an entirely new synthetic route for the preparation of the very useful incompletely condensed trisilanol reagents $[(RSiO_{1.5})_4 (RXSiO_{1.0})_3]_{\Sigma7}$ in particular where X=OH.

Scheme 6

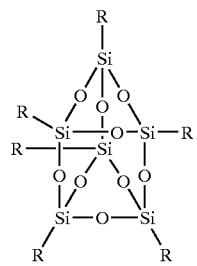

Homoleptic POSS systems $[(RSiO_{1.5})_6]_{\Sigma6}$

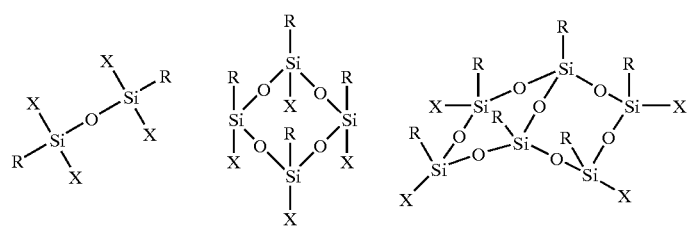

POSS Fragments $[(RXSiO_{0.5})_1]$, $[(RXSiO_{1.0})_4]$, $[(RSiO_{1.5})_2(RXSiO_{1.0})_4]$

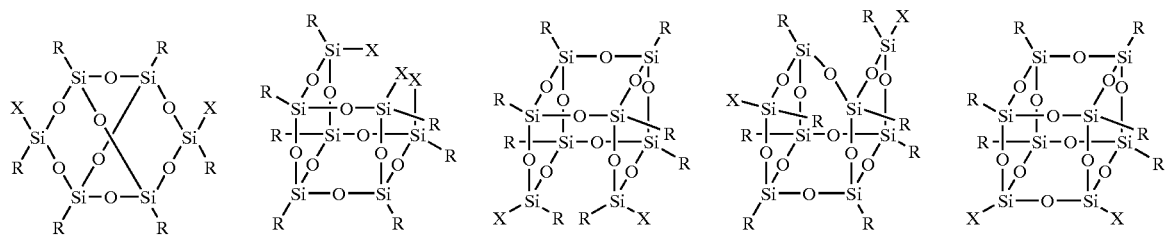

$[(RSiO_{1.5})_4(RXSiO_{1.0})_2]_{\Sigma6}$    $[(RSiO_{1.5})_4(RXSiO_{1.0})_3]_{\Sigma7}$    $[(RSiO_{1.5})_6(RXSiO_{1.0})_2]_{\Sigma8}$    $[(RSiO_{1.5})_6]_{\Sigma6}$ Fuctionalized heteroleptic and homoleptic POSS system

Scheme 7

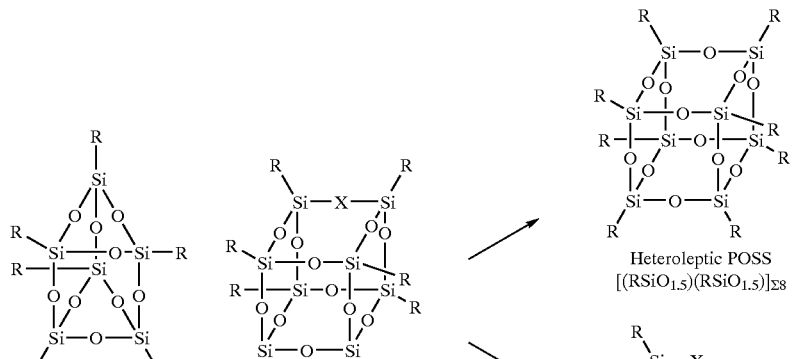

Mixtures of Homoleptic
[(RSiO$_{1.5}$)$_n$]$_{\Sigma 6.8}$

Heteroleptic POSS
[(RSiO$_{1.5}$)(RSiO$_{1.5}$)]$_{\Sigma 8}$

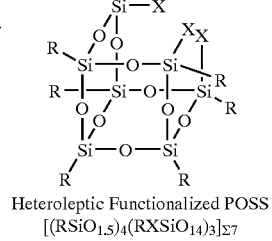

Heteroleptic Functionalized POSS
[(RSiO$_{1.5}$)$_4$(RXSiO$_{1.4}$)$_3$]$_{\Sigma 7}$

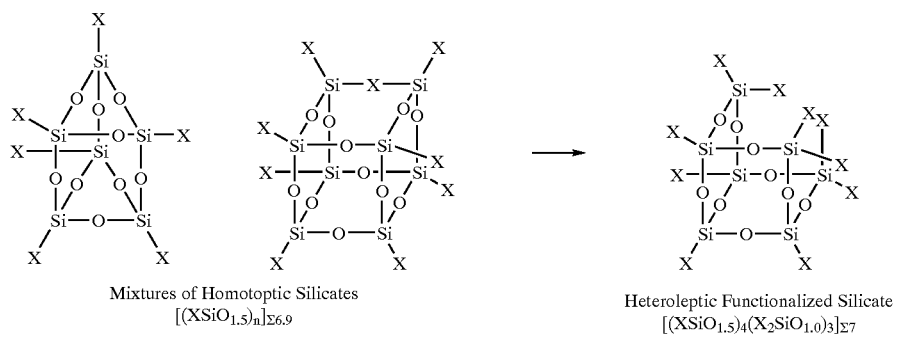

Mixtures of Homotoptic Silicates
[(XSiO$_{1.5}$)$_n$]$_{\Sigma 6.9}$

Heteroleptic Functionalized Silicate
[(XSiO$_{1.5}$)$_4$(X$_2$SiO$_{1.0}$)$_3$]$_{\Sigma 7}$ A final variation of this process is the selective action of base on heteroleptic POSS nanostructures (see Scheme 8). POSS nanostructures bearing more than one type of R group per cage [(RSiO$_{1.5}$)$_m$(RSiO$_{1.5}$)$_n$]$_{\Sigma \#}$ are readily converted through the use of base into functionalized POSS nanostructures [(RSiO$_{1.5}$)$_m$(RXSiO$_{1.0}$)$_n$]$_{\Sigma \#}$. Note that all possible geometric and stereochemical isomers are not shown.

Scheme 8

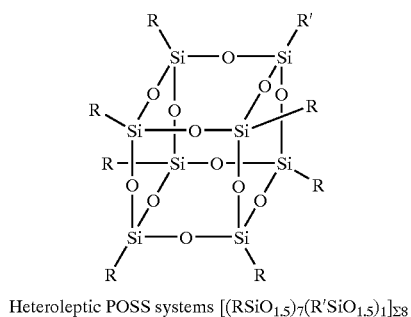

Heteroleptic POSS systems [(RSiO$_{1.5}$)$_7$(R'SiO$_{1.5}$)$_1$]$_{\Sigma 8}$

↓

-continued

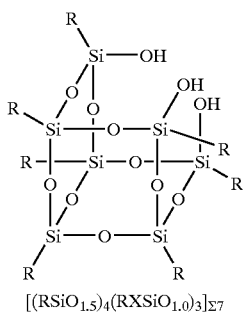
[(RSiO$_{1.5}$)$_4$(RXSiO$_{1.0}$)$_3$]$_{\Sigma 7}$
note R' has been removed during this process

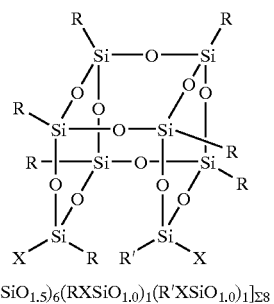
[(RSiO$_{1.5}$)$_6$(RXSiO$_{1.0}$)$_1$(R'XSiO$_{1.0}$)$_1$]$_{\Sigma 8}$

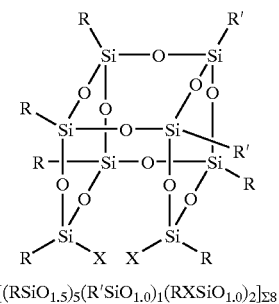
[(RSiO$_{1.5}$)$_5$(R'SiO$_{1.0}$)$_1$(RXSiO$_{1.0}$)$_2$]$_{\Sigma 8}$ Fuctionalized heteroleptic POSS system [(RSiO$_{1.5}$)$_m$(RXSiO$_{1.0}$)$_n$]$_{\Sigma \#}$ The action of base in the described in the preceding paragraph can also be controlled selectively so that silicon atoms can be removed entirely from the silicon oxygen framework of a polyhedral oligomeric silsesquioxane. This represents an entirely new synthetic route for the preparation of the very useful incompletely condensed trisilanol reagents such as [(RSiO$_{1.5}$)$_4$(RXSiO$_{1.0}$)$_3$]$_{\Sigma \#}$ where X=OH in particular. Note that not all stereochemical and geometrical isomers have been shown.

ADDITIONAL MATERIAL—SECTION B: ISOMERS OF POSS SYSTEMS

Methods for Controlling Stereochemistry

Given the three dimensional, nanoscopic nature of POSS systems it is important to realize that a number of isomeric forms for any given formula may be produced by the processes taught in this work. The stereochemistry of these isomers can be controlled by the through methods taught in this patent however, in some cases geometrical isomers will still exist. A number of examples are provided to convey our acknowledgement of the presence of such isomers and that we in no way limit our claims to any one specific stereochemical or geometrical isomer.

Six isomers are possible for difunctional, incompletely condensed POSS nanostructures [(RSiO$_{1.5}$)$_4$(RXSiO$_{1.0}$)$_2$]$_{\Sigma 6}$ as shown in Scheme 9.

Scheme 9

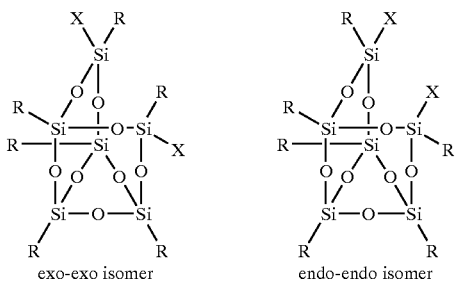
exo-exo isomer        endo-endo isomer

-continued

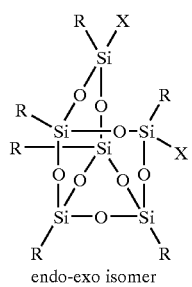
endo-exo isomer

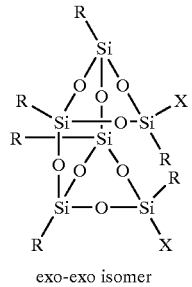
exo-exo isomer

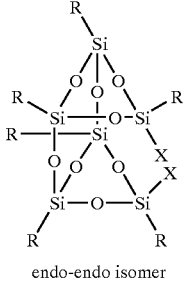
endo-endo isomer

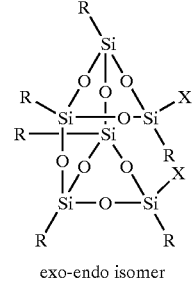
exo-endo isomer

EXAMPLES

NMR spectra were recorded on Omega-500 ($^1$H, 500 MHz; $^{13}$C, 125 MHz; $^{29}$Si, 99 MHz), tetrahydrofuran, methylisobutyl ketone were distilled prior to use. All other solvents were used as purchased without purification.

Examples for Process I

The Conversion of Polysilsesquioxanes into POSS Fragments and Nanostructures

Synthesis of [((C$_6$H$_5$)SiO$_{1.5}$)$_8$]$_{\Sigma 8}$ from [(C$_6$H$_5$)SiO$_{1.5}$]$_\infty$ resin. Tetramethylammonium hydroxide (2.0 mL, 5.57 mmol) was added to [(C$_6$H$_5$)SiO$_{1.5}$]$_\infty$ resin (13.0 g, 100.6 mmol) in toluene (100 mL) at room temperature. The reaction mixture was heated to 80° C. for 12 hours, then cooled to room temperature, acidified with 1N HCl, and filtered to give 12.065 g of [((C$_6$H$_5$)SiO$_{1.5}$)$_8$]$_{\Sigma 8}$ as a white solid. Product was verified by EIMS which shows a molecular ion at 1032.5 amu along with daughter ions corresponding to loss of one, two, and three phenyl groups, respectively, at 954.7, 877.4, and 800.6 amu. The above procedure can be modified for the continuous and batch production. Alternately, benzene, acetone, and methyl ethyl ketone can also be used as solvents for this reaction in place of toluene and KOH can be used instead of tetraalkylammonium bases. In addition, phenyltrimethoxysilane can be used in place of phenyl resin to prepare $[((C_6H_5)SiO_{1.5})_8]_{\Sigma 8}$.

Synthesis of $[((C_6H_5)SiO_{1.5})_{12}]_{\Sigma 12}$ from $[(C_6H_5)SiO_{1.5}]_\infty$ resin. Potassium hydroxide (46.5 g, 829 mmol) was added to $[(C_6H_5)SiO_{1.5}]_\infty$ resin (1000 g, 7740 mmol) in THF (7.8 L) at room temperature. The reaction mixture was heated to reflux for 2 days then cooled to room temperature and filtered to give 443 g of $[((C_6H_5)SiO_{1.5})_{12}]_{\Sigma 12}$ as a microcrystalline white solid. Additional $[(C_6H_5)SiO_{1.5}]_\infty$ resin (912 g, 7059 mmol) was added to the reaction mixture and the solution was heated to reflux for 2 days followed by cooling to room temperature and filtration to give 851 g of $[((C_6H_5)SiO_{1.5})_{12}]_{\Sigma 12}$ as a microcrystalline white solid. Characterization was accomplished by EIMS which shows a molecular ion at 1548.2 amu. The above procedure can be modified for the continuous and batch production. Alternately, methylene chloride can also be used as a solvent for this reaction in place of THF and tetraalkylammonium bases can be used instead of KOH. In addition, phenyltrimethoxysilane can be used in place of $[(C_6H_5)SiO_{1.5}]_\infty$ resin to prepare $[((C_6H_5)SiO_{1.5})_{12}]_{\Sigma 12}$.

Synthesis of $[(c-C_5H_9)SiO_{1.5}]_{\Sigma 8}$ from $[(c-C_5H_9)SiO_{1.5}]_\infty$ resin. A 1.80 gram sample of resin was dissolved into 90 ml of acetone and 90 mg of NaOH was added to the reaction mixture. The mixture was allowed to stir for 3 hours at room temperature and then was heated to reflux overnight. The solution was then cooled and filtered to obtain 1.40 g (77% yield) of pure product. The white microcrystalline powder was confirmed by X-ray diffraction and by HPLC relative to authentic sample.

Synthesis of $[((CH_2=CH)SiO_{1.5})_8]_{\Sigma 8}$ from $[(CH_2=CH)SiO_{1.5}]_\infty$ resin and $[Si_8O_{20}][NMe_4]_{\Sigma 8}$. A 0.63 g sample of resin and 2.22 g of tetramethylammonium silicate salt were dissolved into 20 ml of ethanol and $NMe_4OH$ was added to the reaction mixture until it became highly basic (pH~12). The mixture was allowed to stir for 6 days at room temperature and then was filtered to obtain 1.9 g of $[((CH_2=CH)SiO_{1.5})_8]_{\Sigma 8}$. Alternately a distribution of cages of $[((CH_2=CH)SiO_{1.5})_n]_{\Sigma n}$ where n=8, 10, 12, 14 can be prepared in a similar manner from the reaction of $CH_2=CHSi(OCH_3)_3$ in cyclohexane with $NMe_4OH$ followed by azeotropic distillation of water and methanol. The resulting white solid product $[(CH_2=CH)SiO_{1.5}]_{\Sigma 8-14}$ is obtained in 40% yield and is highly desirable as it is highly soluble in common solvents/reagents and melts at approximately 150° C.

Synthesis of $[((c-C_6H_9)SiO_{1.5})_4((c-C_6H_{11})SiO_{1.5})_4]_{\Sigma 8}$: In a typical reaction, a mixture of (cyclohex-3-enyl)trichlorosilane and cyclohexyltrichlorosilane were added with vigorous stirring to a solution of methanol (200 mL) and water (5 mL). The mixture was then refluxed for 2 days. Upon cooling, volatiles were removed in vacuum to afford a resin containing both cyclohexyl-Si and cyclohex-3-enyl-Si groups. Base catalyzed redistribution of this resin was accomplished by refluxing for 48 h in methyl isobutyl ketone (25 ml) with enough $C_6H_5CH_2N(CH_3)_3OH$ to produce a strongly basic solution (ca. 2 mL of 40% solution in MeOH). Evaporation of the solvent (25° C., 0.01 Torr) gave a white resinous solid, which was stirred with acetone (15 mL) and filtered to afford a mixture $[((R)SiO_{1.5})_n((R')SiO_{1.5})_n]_{\Sigma 8}$ frameworks possessing both cyclohexyl and cyclohex-3-enyl groups. Isolated yields are typically 70–80%.

Note: Excluding enantiomers, there are 22 $[((R)SiO_{1.5})_n((R')SiO_{1.5})_n]_{\Sigma 8}$ frameworks with the formula (cyclohexyl)$_n$(cyclohex-3-enyl)$_{8-n}Si_8O_{12}(0 \leq n \leq 8)$. All are presumed to be present in the product mixture. The relative percentage of each compound is most dependent on the relative amounts of (cyclohex-3-enyl)trichlorosilane and cyclohexyltrichlorosilane used in the reaction, but it may also depend on other factors. The high-resolution $^{29}Si$ NMR spectrum ($C_6D_6$) of each product mixture exhibits a series of well-resolved resonances for framework Si atoms possessing cyclohexyl and cyclohexenyl groups. The chemical shifts of these resonances are constant, but the relative intensities of the resonances depend on the amount of (cyclohex-3-enyl)$SiCl_3$ and cyclohexyl $SiCl_3$ used in the reaction. The product is clearly a mixture of $[((c-C_6H_{11})SiO_{1.5})_n((c-C_6H_9)SiO_{1.5})_n]_{\Sigma 8}$ frameworks. The following chemical shift assignments (in $C_6D_6$) were made based on comparisons to pure, authentic samples of $[((c-C_6H_{11})SiO_{1.5})_8]_{\Sigma 8}$, $[((c-C_6H_9)SiO_{1.5})_8]_{\Sigma 8}$ and $[((c-C_6H_{11})SiO_{1.5})_n((c-C_6H_9)SiO_{1.5})_n]_{\Sigma 8}$:

Si-cyclohexenyl groups with three Si-cyclohexyl nearest neighbors: δ–67.40

Si-cyclohexenyl groups with two Si-cyclohexyl nearest neighbors: δ–67.46

Si-cyclohexenyl groups with one Si-cyclohexyl nearest neighbors: δ–67.51

Si-cyclohexenyl groups with zero Si-cyclohexyl nearest neighbors: δ–67.57

Si-cyclohexyl with three Si-cyclohexenyl groups: δ–67.91

Si-cyclohexyl with two Si-cyclohexenyl groups: δ–67.97

Si-cyclohexyl with one Si-cyclohexenyl groups: δ–68.02

Si-cyclohexyl with zero Si-cyclohexenyl groups: δ–68.08.

A sample prepared by reacting equimolar amounts (0.0125 mol) of (cyclohex-3-enyl)trichlorosilane and cyclohexyltrichlorosilane as described above exhibited all 8 resonances with relative integrated intensities of approximately 4:17:17:5:4:21:22:10. A $^{13}C$ NMR spectrum of the same sample (in $CDCl_3$) resembles a superposition of spectra for pure $[((c-C_6H_{11})SiO_{1.5})_8]_{\Sigma 8}$ and $[((c-C_6H_9)SiO_{1.5})_8]_{\Sigma 8}$, except that resonances for $^{13}C$ nuclei close to the $Si_8O_{12}$ framework are much broader due to the overlap of many resonances with slightly different chemical shifts: δ 127.45 (br m), 127.07, 27.47, 26.85, 26.63, 25.51, 25.08, 23.15, 22.64, 18.68. Analogous results were observed when $[((c-C_6H_{11})SiO_{1.5})_n((c-C_6H_9)SiO_{1.5})_n]_{\Sigma 8}$ mixtures were prepared using the following ratios of (cyclohex-3-enyl)trichlorosilane and cyclohexyltrichlorosilane:

| Entry | (cyclohex-3-enyl)$SiCl_3$ | cyclohexyl$SiCl_3$ |
| --- | --- | --- |
| 1 | 2.7 g (12.5 mmol) | 2.72 g (12.5 mmol) |
| 2 | 2.7 g (12.5 mmol) | 8.18 g (37.5 mmol) |
| 3 | 2.7 g (12.5 mmol) | 10.88 g (50 mmol) |
| 4 | 6.47 g (30 mmol) | 9.79 g (45 mmol) |
| 5 | 1.35 g (6.25 mmol) | 9.52 g (44 mmol) |
| 6 | 5.82 g (27 mmol) | 9.79 g (45 mmol) |
| 7 | 0.68 g (3.13 mmol) | 9.52 g (44 mmol) |

Synthesis of $[(c-C_6H_9)SiO_{1.5}]_{\Sigma 8}$: A charge of (cyclohex-3-enyl)trichlorosilane (10.78 g, 0.05 mol) was added with vigorous stirring to a solution of methanol (200 mL) and water (5 mL). The mixture was then refluxed overnight. Upon cooling, volatiles were removed in vacuo to afford $[((c-C_6H_9)SiO_{1.5})_n]_\infty$ resin in quantitative yield. The $^{29}Si\{^1H\}$ NMR spectrum of the resin exhibits a broad featureless resonance characteristic of silsesquioxane resins and no sharp resonances attributable to discrete polyhedral silsesquioxanes (e.g., $[((R)SiO_{1.5})_n]_{\Sigma n}$ with n=6, 8, 10, 12, 14). Base catalyzed redistribution of $[((c-C_6H_9)SiO_{1.5})_n]_\infty$ resin was accomplished by refluxing for 48 h in methyl isobutyl ketone (25 ml) with enough $C_6H_5CH_2N(CH_3)_3OH$ to produce a strongly basic solution (ca. 2 mL of 40% solution in MeOH). Evaporation of the solvent (25° C., 0.01 Torr)) gave a white resinous solid, which was stirred with acetone (15 mL) and filtered to afford $[((c-C_6H_9)SiO_{1.5})_8]_{\Sigma 8}$ in 80% yield (5.33 g) as a white, microcrystalline solid. Characterization data: $^1$H NMR (500.2 MHz, $CDCl_3$, 300 K) δ5.76 (br s, 2H), 2.09 (br m, 4H), 1.92 (br m, 4H), 1.52 (br m, 1H), 1.08 (br m, 1H). $^{13}$C NMR (125.8 MHz, $CDCl_3$, 300 K) δ127.33, 127.08, 25.46, 25.03, 22.60, 18.60. $^{29}$Si NMR (99.4 MHz, $C_6D_6$, 300 K) δ −67.4. The product was also characterized by a single crystal X-ray diffraction study.]

Synthesis of $[(((CH_3)_2CH)SiO_{1.5})_8]_{\Sigma 8}$: Water (1 mL) was added carefully with vigorous stirring to a solution of $(CH_3)_2CHSiCl_3$ (6.15 g, 34.8 mmol) in methanol (100 mL). The solution was then refluxed for 24 h. Upon cooling, the solvent was evaporated to afford a quantitative yield of $[i\text{-PrSiO}_{3/2}]_n$ resin as a pale yellow liquid. The $^{29}$Si{$^1$H} NMR spectrum of the resin exhibits a broad envelope of resonances characteristic of silsesquioxane resins and indicates that very little, if any, discrete polyhedral silsesquioxanes (e.g., $[((CH_3)_2CH)SiO_{1.5}]_n$ with n=6, 8, 10, 12, 14) are present. Base catalyzed redistribution of the $[((CH_3)_2CH)SiO_{1.5}]_n$ resin was accomplished by refluxing for 6 h in methyl isobutyl ketone (25 ml) with water (1.4 mL) and enough $C_6H_5CH_2N(CH_3)_3OH$ to produce a strongly basic solution (ca. 1 mL of 40% solution in MeOH). The crude equilibration mixture was diluted with $Et_2O$ (200 mL), washed several times with water, dried over anhydrous $MgSO_4$ and concentrated to afford $[(((CH_3)_2CH)SiO_{1.5})_8]_{\Sigma 8}$ as a white microcrystalline powder. The yield after one equilibration is typically 15–30%, but additional $[(((CH_3)_2CH)SiO_{1.5})_8]_{\Sigma 8}$ can be obtained by base-catalyzed redistribution of $[((CH_3)_2CH)SiO_{1.5}]_\infty$ resin present in the mother liquors. The compound prepared in this fashion is identical to $[(((CH_3)_2CH)SiO_{1.5})_8]_{\Sigma 8}$ prepared via the method described by Unno (Chemistry Letters 1990, 489) Characterization data: $^1$H NMR (500.2 MHz, $CDCl_3$, 300 K) δ 1.036 (d, J=6.9 Hz, 48H, $CH_3$); 0.909 (sept, J=7.2 Hz, 8H, CH). $^{13}$C NMR (125.8 MHz, $CDCl_3$, 300 K) δ 16.78 (s, $CH_3$); 11.54 (s, SiCH). $^{29}$Si NMR (99.4 MHz, $CDCl_3$, 300 K)δ−66.3.

Synthesis of $[((CH_3)_2CHCH_2)SiO_{1.5}]_{\Sigma 8}$: $(CH_3)_2CHCH_2SiCl_3$ (8.3 mL, 0.05 mol) was added with vigorous stirring to a mixture of $CH_2Cl_2$ (200 mL) and water (5 mL). The mixture was then refluxed overnight. Upon cooling, the $CH_2Cl_2$ layer was decanted, dried over $CaCl_2$ (5 g) and evaporated to afford $[((CH_3)_2CHCH_2)SiO_{1.5}]_\infty$ resin in quantitative yield. The $^{29}$Si {$^1$H} NMR spectrum of the resin exhibits a broad featureless resonance characteristic of silsesquioxane resins and no sharp resonances attributable to discrete polyhedral silsesquioxanes (e.g., $[(((CH_3)_2CHCH_2)SiO_{1.5})_n]_{\Sigma n}$ with n=6, 8, 10, 12, 14). Base catalyzed redistribution of $[((CH_3)_2CHCH_2)SiO_{1.5}]_\infty$ resin was accomplished by refluxing for 48 h in methyl isobutyl ketone (25 ml) with enough $C_6H_5CH_2N(CH_3)_3OH$ to produce a strongly basic solution (ca 2 mL of 40% solution in MeOH). Evaporation of the solvent (25° C., 0.01 Torr)) gave a white resinous solid, which was stirred with acetone (15 mL) and filtered to afford $[(((CH_3)_2CHCH_2)SiO_{1.5})_8]_{\Sigma 8}$ in 30% yield (1.64 g) as a white, microcrystalline solid. Evaporation of the acetone solution gives more $[i\text{-BuSiO3/2}]_\infty$ resin, which undergoes further base catalyzed redistribution to produce more $[(((CH_3)_2CHCH_2)SiO_{1.5})_8]_{\Sigma 8}$. The combined yield of $[(((CH_3)_2CHCH_2)SiO_{1.5})_8]_{\Sigma 8}$ after three resin redistribution reactions is typically greater than 60%. Characterization data: $^1$H NMR (500.2 MHz, $C_6D_6$, 300 K) δ 2.09 (m, 8H, CH); 1.08 (d, J=6.6 Hz, 48H, CH3); 0.84 (d, J=7.0 Hz, 16H, $CH_2$) $^{13}$C NMR (125.8 MHz, $C_6D_6$, 300 K) δ 25.6 (s, $CH_3$); 24.1 (s, CH); 22.7 (s, $CH_2$). $^{29}$Si NMR (99.4 MHz, $C_6D_6$, 300 K) δ−67.5.

Preparation of $[((c-C_6H_{11})SiO_{1.5})_4((c-C_6H_{11})(OH)SiO_{1.0})_3]_{\Sigma 7}$ from $[(c-C_6H_{11})SiO_{1.5}]_\infty$Resin: $[(c-C_6H_{11})SiO_{1.5}]_\infty$ resin was prepared in two steps from $C_6H_5SiCl_3$. In the first step, water was added to a toluene solution of phenyltrichlorosilane to produce $[C_6H_5SiO_{1.5}]_\infty$ resin according to the procedure reported by Brown (J. Am. Chem. Soc., (1965), 87, 4317). This $[C_6H_5SiO_{1.5}]_\infty$ resin (1.0 g) was then dissolved in cyclohexane (50 mL) and hydrogenated to $[(c-C_6H_{11})SiO_{1.5}]_\infty$ resin in a Parr minireactor (150° C., 220 psi, 48 h) using 10% Pd/C (1.3 g) as the catalyst. Filtration to remove the catalyst and evaporation of the solvent in vacuo afforded the $[(c-C_6H_{11})SiO_{1.5}]_\infty$ resin as a white solid. The $^1$H NMR spectrum of this resin exhibits broad featureless resonances characteristic of $c$-$C_6H_{11}Si$ groups and no resonances attributable to $C_6H_5Si$ groups. The $^{29}$Si{$^1$H} NMR spectrum exhibits a broad featureless resonance characteristic of cyclohexyl silsesquioxane resins and no sharp resonances attributable to discrete polyhedral silsesquioxanes (e.g., $[((c-C_6H_{11})SiO_{1.5})_n]_{\Sigma n}$ with n=6, 8, 10, 12, 14).

Base catalyzed redistribution of $[(c-C_6H_{11})SiO_{1.5}]_\infty$ resin (0.5 g) was accomplished by refluxing in methyl isobutyl ketone (40 ml) with 35% aqueous $NEt_4OH$ (2 mL, 5 mmol) in MIK (40 mL) for 10 h. After cooling, the solution was decanted and evaporated to dryness in vacuo to afford a brownish solid. Analysis of this solid by $^{29}$Si {$^1$H} NMR spectroscopy and HPLC indicated the formation of $[((c-C_6H_{11})SiO_{1.5})_4((c-C_6H_{11})(OH)SiO_{1.0})_3]_{\Sigma 7}$ in 10–15% yield.

Examples for Process II

Reactions Between POSS Systems and Silsesquioxane/Siloxane Fragments

Preparation of $[((CH_3)SiO_{1.5})_7(CH_3CH_2OOC(CH_2)_{10})SiO_{1.5})_1]_{\Sigma 8}$: One equivalent of ethylundecanoate triethoxysilane and seven equivalents of methyltrimethoxy silane (1.9 g) (were added dropwise to a refluxing solution of acetone (40 m) and 1 ml of water containing 0.15 equivalents, 235.6 mg) of potassium acetate. The reaction was refluxed for 3 days cooled and the white crystalline product was collected via filtration and was washed with MeOH to remove resin. The product was characterized by MS and X-ray diffraction. A similar procedure was followed for each of the following compounds:
$[((CH_3)SiO_{1.5})_6(CH_3(CH_2)_7)SiO_{1.5})_2]_{\Sigma 8}$, $[((CH_3)SiO_{1.5})_7(CH_2=CH)SiO_{1.5})_1]_{\Sigma 8}$, $[((CH_3)SiO_{1.5})_4(CH_2=CH)SiO_{1.5})_4]_{\Sigma 8}$, $[((CH_3)SiO_{1.5})_6(CH_2=CH)SiO_{1.5})_2]_{\Sigma 8}$, $[((CH_3)SiO_{1.5})_7(H_2N(CH_2)_3)SiO_{1.5})_1]_{\Sigma 8}$, $[((C_6H_5)SiO_{1.5})_7((CH_2=CH)SiO_{1.5})_1]_{\Sigma 8}$, $[((CH_3)SiO_{1.5})_7(H_2N(CH_2)_3)SiO_{1.5})_1]_{\Sigma 8}$, $[((c-C_5H_9)SiO_{1.5})_7((CH_3CH_2OOC(CH_2)_{10})SiO_{1.0})_1]_{\Sigma 8}$, $[((c-C_5H_9)SiO_{1.5})_7((CH_2=CH)SiO_{1.0})_1]_{\Sigma 8}$.

Preparation of $[((c-C_6H_{11})SiO_{1.5})]_{\Sigma 6,8}$: A 1.23 g charge of $[((c-C_6H_{11})(OH)_2SiOSi(OH)_2(c-C_6H_{11})]$ was added to ethanol (50 ml) followed by the addition of 5 meq of $KHCO_3$. The reaction mixture was then allowed to react during reflux for 3 hours then the mixture was made basic through the addition of $Bu_4NOH$ and refluxed for 2 days. The reaction was then allowed to cool and neutralized with the addition of acetic acid and the volatiles removed under reduced pressure. The residue was washed with MeOH repeatedly and dried. Yield of product 93%. The product was characterized by MS and X-ray diffraction.

Preparation of $[((c-C_6H_{11})SiO_{1.5})_8]_{\Sigma 8}$: Mixtures of $[((c-C_6H_{11})SiO_{1.5})_6]_{\Sigma 6}[((c-C_6H_{11})SiO_{1.5})_6((c-C_6H_{11})(OH)SiO_{1.0})_2]_{\Sigma 8}$ and $[((c-C_6H_{11})SiO_{1.5})_4(c-C_6H_{11})(OH)SiO_{1.0})_3]_{\Sigma 7}$ dissolved in methylisobutylketone and reacted with 20% aq. $Et_4NOH$ under reflux for 4 days produce nearly $[((c-C_6H_{11})SiO_{1.5})_8]_{\Sigma 8}$. Authenticity of product was verified relative to authentic sample.

Preparation of $[((CH_3)SiO_{1.5})]_{\Sigma 8}$: A 1.22 kg (7.5 mole) charge of $CH_3Si(OCH_3)_3$ was added to acetone (8 l) followed by the addition of 2.37 equivalents of $Me_4NOH$ and 405 g of water. The reaction mixture was then allowed to react during reflux for 24 hours and the product was then collected by filtration. The product was washed repeatedly with MeOH and dried. Yield 466.2 g of product 93%. The product was characterized by MS and X-ray diffraction. A similar procedure can be used to prepare $[(CH_2=CH)SiO_{1.5})_8]_{\Sigma 8} \cdot [(c-C_6H_{11})SiO_{1.5})_8]_{\Sigma 8}$. Modification of this procedure will afford continuous and batch-scale production.

Preparation of $[((CH_3CH_2)SiO_{1.5})_8]_{\Sigma 8}$: A similar procedure to that above for $[((CH_3)SiO_{1.5})_8]_{\Sigma 8}$, was followed in acetone to produce a $[(CH_3CH_2)SiO_{1.5})]_\infty$ resin which is then taken up in THF using KOH to produce $[(CH_3CH_2)SiO_{1.5})_8]_{\Sigma 8}$: $^1H$ NMR (500 MHz, $CDCl_3$): δ(ppm) 0.602 (q, J=7.9 Hz, 16H), 0.990 (t, J=7.9 Hz, 24H); $^{13}C$ NMR (125 MHz, $CDCl_3$): δ(ppm) 4.06, 6.50; $^{29}Si$ NMR (99.4 MHz, $CDCl_3$): δ(ppm)−65.42. Modification of this procedure will afford continuous and batch-scale production.

Preparation of $[((CH_3)_2CH_2CHCH_3CH_2)SiO_{1.5})_n]_{\Sigma n}$ n=8, 10. A similar procedure to that above for $[((CH_3)SiO_{1.5})_8]_{\Sigma 8}$ was followed using KOH to produce $[((CH_3)_2CH_2CHCH_3CH)SiO_{1.5})_n]_{\Sigma n}$ n=8, 10 in quantitative yield. $^1H$ NMR (500 MHz, $CDCl_3$): δ(ppm) 0.563 (dd, J=8.2, 15.1 Hz, 1H), 0.750 (dd, J=5.6, 15.1 Hz, 1H), 0.902 (s, 9H), 1.003 (d, J=6.6 Hz, 3H), 1.125 (dd, J=6.4, 13.9 Hz, 1H), 1.325 (br d, J=13.9 Hz, 1 H), 1.826 (m, 1H); $^{13}C$ NMR (125 MHz, $CDCl_3$): δ(ppm) 23.72, 24.57, 25.06, 25.31, 25.71, 25.75, 25.78, 26.98, 29.52, 30.22, 30.28, 31.22, 53.99, 54.02, 54.33; $^{29}Si$ NMR (99.4 MHz, $CDCl_3$): δ(ppm) −69.93, −67.75 $[((CH_3)_2CH_2CHCH_3CH_2)SiO_{1.5})_{12}]_{\Sigma 12}$, −67.95 $[((CH_3)_2CH_2CHCH_3CH_2)SiO_{1.5})_{10}]_{\Sigma 10}$, −66.95 $[((CH_3)_2CH_2CHCH_3CH_2)SiO_{1.5})_8]_{\Sigma 8}$. EIMS: m/e 1039 (17%, M$^+$ $[((CH_3)_2CH_2CHCH_3CH_2)SiO_{1.5})_{10}]_{\Sigma 10}$), 1207 (100%, M$^+$ $[((CH_3)_2CH_2CHCH_3CH_2)SiO_{1.5})_8]_{\Sigma 8}$. Modification of this procedure will afford continuous and batch-scale production.

Preparation of $[(CF_3CH_2CH_2SiO_{1.5})_8]_{\Sigma 8}$. A similar procedure to that above for $[((CH_3)SiO_{1.5})_8]_{\Sigma 8}$ was followed using KOH and methanol as a solvent to produce the following mixture of products $[(CF_3CH_2CH_2SiO_{1.5})_8]_{\Sigma 12}$ 97.5%, $[(CF_3CH_2CH_2SiO_{1.5})_8]_{\Sigma 10}$ 2.5% $^1H$ NMR (300 MHz, THF-$d_8$): δ(ppm) 0.978 (m, $CH_2$), 2.234 (m, $CF_3CH_2$); $^{13}C$ NMR (75.5 MHz, THF-$d_8$): δ(ppm) 4.99 (s, $CH_2$), 5.42 (s, $CH_2$), 28.14 (q, J=30.5 Hz, $CF_3CH_2$), 28.32 (q, J=30.5 Hz, $CF_3CH_2$), 128.43 (q, J=276 Hz, $CF_3$), 128.47 (q, J=276 Hz, $CF_3$); $^{29}Si$ NMR (59.6 MHz, THF-$d_8$): δ(ppm)−68.38 ($T_{12}$), −65.84 ($T_{10}$), −65.59 ($T_{12}$); $^{19}F$. $\{^1H\}$ NMR (376.5 MHz, THF-$d_8$) δ(ppm)−71.67, −71.66. EIMS: m/e 1715 (100%, M$^+$—$H_4CF_3$).

Preparation of $[(CH_3(CH_2)_{16}CH_2SiO_{1.5})_n]_{\Sigma n}$: where n=8, 10,12. A similar procedure to that above for $[((CH_3)SiO_{1.5})_8]_{\Sigma 8}$ was followed to produce the following mixture of products $^1H$ NMR (500 MHz, $CDCl_3$): δ(ppm) 0.604 (m, 2H), 0.901 (t, J=7.0 Hz, 3H), 1.280–1.405 (m, 32H); $^{13}C$ NMR (125 MHz, $CDCl_3$): δ(ppm) 12.02, 14.15, 22.79, 22.89, 29.49, 29.75, 29.79, 29.85, 29.90, 32.05, 32.76; $^{29}Si$ NMR (99.4 MHz, $CDCl_3$): δ(ppm) −70.48, −68.04 $[(CH_3(CH_2)_{16}CH_2SiO_{1.5})_{12}]_{\Sigma 12}$, −68.22 $[(CH_3(CH_2)_{16}CH_2SiO_{1.5})_{10}]_{\Sigma 10}$, −66.31 $[(CH_3(CH_2)_{16}CH_2SiO_{1.5})_8]_{\Sigma 8}$.

Preparation of $[((CH_3)_2CHCH_2)SiO_{1.5})_4((CH_3)_2CHCH_2)(OH)SiO_{1.0})_3]_{\Sigma 7}$ from $(CH_3)_2CHCH_2Si(OCH_3)_3$: Isobutyltrimethoxysilane (93.3 g, 523.3 mmol) was added dropwise to $LiOH \cdot H_2O$ (10.0 g, 238.3 mmol) and water (8.0 mL, 444 mmol) in 88/12 acetone/methanol (500 mL) at reflux. The reaction mixture was heated at reflux the was acidified by quenching it into 1N HCl(aq) (500 mL) and stirring for 2 h. The resulting solid was filtered and washed with $CH_3CN$ (2×175 mL) and air dried. The product $[((CH_3)_2CHCH_2)SiO_{1.5})_4((CH_3)_2CHCH_2)(OH)SiO_{1.0})_3]_{\Sigma 7}$ was isolated in 94% yield at 98.8% purity. Note that the above procedure can be adapted to both continuous and batch production methods.

Preparation of $[(CH_3CH_2)SiO_{1.5})_4(CH_3CH_2)(OH)SiO_{1.0})_3]_{\Sigma 7}$: A similar procedure to that above for $[((CH_3)_2CHCH_2)SiO_{1.5})_4((CH_3)_2CHCH_2)(OH)SiO_{1.5})_3]_{\Sigma 7}$ was followed using acetone and LiOH to produce $[(CH_3CH_2)SiO_{1.5})_4(CH_3CH_2)(OH)SiO_{1.0})_3]_{\Sigma 7}$ as white crystalline solid in 40–80% yield. $^1H$ NMR (500 MHz, $CDCl_3$): δ(ppm) 0.582 (q, J=7.9 Hz, 6H), 0.590 (q, J=7.9 Hz, 2H), 0.598 (q, J=7.9 Hz, 6H), 0.974 (t, J=7.9 Hz, 3H), 0.974 (t, J=7.9 Hz, 9H), 0.982 (t, J=7.9 Hz, 9H), 6.244 (br, 3H); $^{13}C$ NMR (125 MHz, $CDCl_3$): δ(ppm) 3.98 (1), 4.04 (3), 4.50 (3), 6.42 (3), 6.46 (4); $^{29}Si$ NMR (99.4 MHz, $CDCl_3$): δ(ppm)−65.85 (3), −64.83 (1), −56.36 (3). MS (electrospray): m/e 617 (70%, [M+Na]$^+$), 595 (100%, [M+H]$^+$). Modification of this procedure will afford continuous and batch-scale production.

Preparation of $[((CH_3)SiO_{1.5})_7(CH_3CH_2OOC(CH_2)_{10})SiO_{1.5})_1]_{\Sigma 8}$: One equivalent of Triethoxyethylundecanoate and seven equivalents of methyltrimethoxy silane (1.9 g) (were added dropwise to a refluxing solution of acetone (40 ml) and 1 ml of water containing 0.15 equivalents, 235.6 mg) of potassium acetate. The reaction was refluxed for 3 days cooled and the white crystalline product was collected via filtration and was washed with MeOH to remove resin. The product was characterized by MS and X-ray diffraction.

Preparation of $[((c-C_6H_{11})SiO_{1.5})_4((c-C_6H_{11})(OH)SiO_{1.0})_3]_{\Sigma 7}$ from $[((c-C_6H_{11})SiO_{1.5})_6((c-C_6H_{11})(OH)SiO_{1.0})_1]_{\Sigma 7}$: 35% aqueous $NEt_4OH$ (20 μL, 0.05 mmol) is added to a THF (0.5 mL) solution of $[((c-C_6H_{11})SiO_{1.5})_6((c-C_6H_{11})(OH)SiO_{1.0})_1]_{\Sigma 7}$(48 mg, 0.05 mmol) and mixed well through agitation. After 1.5 h at 25° C., several drops of $C_6D_6$ were added and $^{29}Si\{^1H\}$ NMR spectrum was recorded. The spectrum matched the data for the previously reported for basic solutions of $[((c-C_6H_{11})SiO_{1.5})_4((c-C_6H_{11})(OH)SiO_{1.0})_3]_{\Sigma 7}$.

Preparation of $[((c-C_6H_{11})SiO_{1.5})_2((c-C_6H_{11})(OH)SiO_{1.0})_4]_{\Sigma 6}$ from $[((c\ C_6H_{11})SiO_{1.5})_4((c-C_6H_{11})(OH)SiO_{1.0})_2]_{\Sigma 6}$: $C_2$-symmetry-$[((c-C_6H_{11})SiO_{1.5})_4((c-C_6H_{11})(OH)SiO_{1.0})_2]_{\Sigma 6}$ (38 mg, 0.05 mmol) was reacted with 35% aqueous $NEt_4OH$ (20 μL, 0.05 mmol) in THF (0.5 mL) and after 30 minutes at 25° C., several drops of $C_6D_6$ were added and $^{29}Si\{^1H\}$ NMR spectrum was recorded. The spectrum matched the spectrum of authentic $[((c-C_6H_{11})SiO_{1.5})_2((c-C_6H_{11})(OH)SiO_{1.0})_4]_{\Sigma 6}$ prepared by the reaction of $[((c-C_6H_{11})SiO_{1.5})_6]_{\Sigma 6}$ with aqueous $NEt_4OH$.

Preparation $[((c-C_6H_{11})SiO_{1.5})_4((c-C_6H_{11})(OH)SiO_{1.0})_3]_{\Sigma 7}$ from $[((c-C_6H_{11})SiO_{1.5})_6((c-C_6H_{11})(OH)SiO_{1.0})_1]_{\Sigma 7}$: A solution of $[((c-C_6H_{11})SiO_{1.5})_6((c-C_6H_{11})(OH)SiO_{1.0})_1]_{\Sigma 7}$ (0.46 mmol) and 35% aqueous $NEt_4OH$ (0.2 mL, 0.49 mmol) was refluxed in THF (5 mL) for 5 h then neutralized with dilute aqueous HCl. Evaporation of the volatiles afforded a white solid, which was dissolved in $Et_2O$ and dried over anhydrous $MgSO_4$. Filtration and evaporation of the solvent afforded a white microcrystalline solid in high yield. Analysis of the product mixture by $^{29}$Si NMR spectroscopy indicated that the major product was [((c-$C_6H_{11}$)$SiO_{1.5}$)$_4$((c-$C_6H_{11}$)(OH)$SiO_{1.0}$)$_3$]$_{\Sigma 7}$; small amounts of [((c-$C_6H_{11}$)$SiO_{1.5}$)$_8$]$_{\Sigma 8}$ were also present.

Preparation of [((c-$C_5H_9$)$SiO_{1.5}$)$_8$(($CH_3$)$_2SiO_{1.0}$)$_1$]$_{\Sigma 9}$ from [((c-$C_5H_9$)$SiO_{1.5}$)$_8$]$_{\Sigma 8}$: Reaction of [((c-$C_5H_9$)Si$O_{1.5}$)$_8$]$_{\Sigma 8}$ (2.21 g, 2.28 mmol) and octamethyltetracyclosiloxane (1.35 g, 4.56 mmol) in 2 mL toluene with $Me_4$NOH (9.4 mg of 25% solution in MeOH, 0.626 mmol) is allowed for 24 h at 120° C. The mixture is then quenched with 6 N HCl (1 mL), extracted with $Et_2O$ (3 mL), evaporated to dryness to give a white pasty solid which contains a mixture of 70% [((c-$C_5H_9$)$SiO_{1.5}$)$_8$(($CH_3$)$_2SiO_{1.0}$)$_1$]$_{\Sigma 9}$, polydimethylsiloxane, and 29% [((c-$C_5H_9$)$SiO_{1.5}$)$_8$]$_{\Sigma 8}$. Analysis by $^{29}$Si{$^1$H} NMR ($CDCl_3$) spectroscopy revealed [((c-$C_5H_9$)$SiO_{1.5}$)$_8$(($CH_3$)$_2SiO_{1.0}$)$_1$]$_{\Sigma 9}$ at (δ−65.76, −68.30, −68.34, 2:2:4).

Preparation of [(($CH_3$)$_2CHCH_2$)$SiO_{1.5}$)$_8$((5-norbornene-2-ethyl)($CH_3$))$SiO_{1.5}$)$_1$]$_{\Sigma 9}$ from [(($CH_3$)$_2CHCH_2$)$SiO_{1.5}$)$_6$(($CH_3$)$_2CHCH_2$)(OH)$SiO_{1.0}$)$_2$]$_{\Sigma 8}$. An $Et_2O$ (5 mL) solution of [(($CH_3$)$_2CHCH_2$)$SiO_{1.5}$)$_6$(($CH_3$)$_2CHCH_2$)(OH)Si$O_{1.0}$)$_2$]$_{\Sigma 8}$ (890 mg, 1.00 mmol) was added a mixture of dichloromethyl(5-norbornene-2-ethyl)silane (endo/exo=3/1, 282.3 mg, 1.20 mmol), $Et_3N$ (195 μL, 1.4 mmol), and $Et_2O$ (5 mL) at −35° C. After addition the resulting mixture was warmed to room temperature and stirred for 20 h. The mixture was hydrolyzed and extracted with diethyl ether, washed with brine, and dried over $Na_2SO_4$. Evaporation of the volatiles gave [(($CH_3$)$_2CHCH_2$)$SiO_{1.5}$)$_8$((5-norbornene-2-ethyl)($CH_3$))$SiO_{1.5}$)$_1$]$_{\Sigma 9}$ (720 mg, 0.68 mmol) as a white powder in 68% yield. $^1$H NMR ($CDCl_3$) δ 0.10 (s, 9H), 0.12 (s, 3H), 0.48–0.68 (m, 72H), 0.84–1.05 (m, 194H), 1.06–1.36 (m, 18H), 1.40–1.50 (m, 4H), 1.80–1.94 (m, 32H), 1.95–2.03 (m, 3H), 2.55 (br s, 1H), 2.77 (br s, 3H), 2.78–2.83 (m, 4H), 5.93 (q, $^3$J=5 Hz, $^3$J=10 Hz, 3H), 6.04 (q, $^3$J=5 Hz, $^3$J=10 Hz, 1H), 6.09–6.14 (m, 4H). $^{13}$C NMR ($CDCl_3$) δ−1.11, 15.86, 16.21, 22.58, 23.20, 23.83, 23.98, 24.06, 24.18, 25.76, 25.81, 25.89, 27.71, 29.50, 32.41, 33.10, 41.89, 41.97, 42.09, 42.65, 45.10, 45.20, 46.03, 49.61, 132.35, 136.29, 136.87, 136.96. $^{29}$Si NMR ($CDCl_3$) δ−69.25, −69.23, −69.21, −69.15, −67.04, −21.73, −21.63.

Preparation [(($CH_3$)$SiO_{1.5}$)$_7$($CH_2$=$CCH_3$(O)CO($CH_2$)$_3$)$SiO_{1.5}$)$_1$]$_{\Sigma 8}$: An $Et_2O$ (80 mL) solution of Methacryloxypropyltrichlorosilane (0.69 mL, 3.31 mmol) and 1,8-bis (dimethylamino)naphthalene (2.34 g, 10.91 mmol) was added to an $Et_2O$ (20 mL) solution of [(($CH_3$)$SiO_{1.5}$)$_4$(($CH_3$)(OH)$SiO_{1.0}$)$_3$]$_{\Sigma 7}$ (1.26 g, 2.54 mmol) at −35° C. The mixture was further stirred at room temperature for 5 h and then concentrated under reduced pressure. The residue was extracted with ether. The insoluble materials were filtered. The filtrate was concentrated to give an oil-like solid. The solid was passed through a silica gel column using hexane/$Et_2O$ (50:1) as an eluent. Evaporation of the volatiles gave [(($CH_3$)$SiO_{1.5}$)$_7$($CH_2$=$CCH_3$(O)CO($CH_2$)$_3$)$SiO_{1.5}$)$_1$]$_{\Sigma 8}$ (415 mg, 0.64 mmol) as a white solid in 25% yield. $^1$H NMR ($CDC_3$) δ 0.136 (s, 3H), 0.142 (s, 12H), 0.146 (s, 6H), 0.64–0.72 (m, 2H), 1.72–1.82 (m, 2H), 1.94 (s, 3H), 4.11 (t, J=6.78 Hz, 3H), 5.54 (t, J=1.58 Hz, 1H), 6.10 (br s, 1H). $^{13}$C NMR ($CDCl_3$) δ−4.56, −4.48, 8.24, 18.31, 22.19, 66.46, 125.16, 136.53, 167.46. $^{29}$Si NMR ($CDCl_3$) δ −67.71, −66.00, −65.69. Calcd for $C_{14}H_{32}O_{14}Si_8$: C, 25.91; H, 4.97. Found: C, 25.69; H, 4.99.

Preparation of [(($CH_3C_6H_4$)$SiO_{1.5}$)$_8$(($CH_2$=$CCH_3$)(O)CO($CH_2$))($H_3C$)$SiO_{1.0}$)$_1$]$_{\Sigma 9}$: An $Et_2O$ (20 mL) solution of a mixture of [(($CH_3C_6H$)$SiO_{1.5}$)$_6$(($CH_3C_6H_5$)(OH)Si$O_{1.0}$)$_2$]$_{\Sigma 8}$/[(($CH_3C_6H_5$)$SiO_{1.5}$)$_8$]$_{\Sigma 8}$ (581.9 mg, 4/1, 0.40 mmol) was added a mixture of dichloromethacryloxypropylmethylsilane (108.8 μL, 0.50 mmol), $Et_3N$ (139.4 μL, 1.00 mmol), and $Et_2O$ (3 mL) at room temperature and stirred for 20 h, was then hydrolyzed, and extracted with diethyl ether. The extract was washed with brine, dried over $Na_2SO_4$ and after evaporation of the volatiles gave [(($CH_3C_6H_4$)$SiO_{1.5}$)$_8$(($CH_2$=$CCH_3$)(O)CO($CH_2$)$_3$)($H_3C$)$SiO_{1.0}$)$_1$]$_{\Sigma 9}$ (475.5 mg, 0.36 mmol) as a white solid in 89% yield. $^1$H NMR ($CDCl_3$) δ 0.43 (s, 3H), 0.85–0.90 (m, 2H), 1.87–1.95 (m, 2H), 1.95 (s, 3H), 2.42 (s, 6H), 2.43 (s, 12H), 2.44 (s, 6H), 4.16 (t, $^3$J=6.8 Hz, 2H), 5.56 (br s, 1H), 6.11 (br s, 1H), 7.19–7.29 (m, 18H), 7.59–7.68 (m, 10H), 7.71–7.79 (m, 4H). $^{13}$C NMR ($CDCl_3$) δ−0.92, 12.87, 18.24, 21.57, 22.12, 127.14, 127.38, 127.43, 128.49, 128.55, 128.58, 128.64, 133.94, 134.16, 134.19, 134.25, 140.23, 140.39, 140.59, 167.37. $^{29}$Si NMR ($CDCl_3$) δ −78.72, −78.51, −76.98, −18.75.

Preparation of [(($CH_3C_6H_4$)$SiO_{1.5}$)$_7$(($CH$=$CH_2$)($CH_3$)$_2SiO_{1.0}$)$_3$]$_{\Sigma 7}$: A THF (15 mL) solution of [(($CH_3C_6H_5$)Si$O_{1.5}$)$_8$]$_{\Sigma 8}$ (572.9 mg, 0.50 mmol) was added an aqueous solution of $Et_4NOH$ (35%, 226.2 μL, 0.55 mmol) at room temperature. After addition the resulting mixture was stirred at the same temperature for 6 h. The mixture was neutralized with 1N HCl solution and extracted with diethyl ether. The organic layer was washed with brine, dried over $MgSO_4$ and volatiles evaporated to give [(($CH_3C_6H_4$)$SiO_{1.5}$)$_4$(($CH_3C_6H_5$)(OH)$SiO_{1.0}$)$_3$]$_{\Sigma 7}$. The [(($CH_3C_6H_5$)$SiO_{1.5}$)$_4$(($CH_3C_6H_5$)(OH)$SiO_{1.0}$)$_3$]$_{\Sigma 7}$ was dissolved in an $Et_2O$ (30 mL) and a mixture of chlorodimethylvinylsilane (505 μL, 3.66 mmol), $Et_3N$ (595 μL, 4.27 mmol), and $Et_2O$ (3 mL) was added at room temperature and stirred for 7 h. The mixture was hydrolyzed and extracted with diethyl ether washed with brine, dried over $MgSO_4$, and evaporated to give a solid. Recrystallization of the solid from hexane afforded colorless crystals of [(($CH_3C_6H_4$)$SiO_{1.5}$)$_4$(($CH_3C_6H_5$)(OSi($CH_3$)$_2$($CH$=$CH_2$))$SiO_{1.0}$)$_3$]$_{\Sigma 7}$ (230 mg, 0.18 mmol) in 36% yield. $^1$H NMR ($CDCl_3$) δ 0.38 (s, 18H), 2.33 (s, 9H), 2.34 (s, 9H), 2.39 (s, 3H), 5.90 (dd, $^2$J=20.4 Hz, $^3$J=3.8 Hz, 3H), 6.03 (dd, $^3$J=14.9 Hz, $^3$J=3.8 Hz, 3H), 6.28 (dd, $^2$J=20.4 Hz, $^3$J=3.8 Hz, 3H), 7.01 (d, $^3$J=7.7 Hz, 12H), 7.19 (d, $^3$J=7.7 Hz, 2H), 7.27 (d, $^3$J=7.7 Hz, 6H), 7.41 (d, $^3$J=7.7 Hz, 6H), 7.53 (d, $^3$J=7.7 Hz, 2H). $^{13}$C NMR ($CDCl_3$) δ 0.42, 21.51, 21.54, 21.60, 127.51, 127.97, 128.14, 128.26, 128.55, 129.51, 132.26, 134.06, 134.11, 134.17, 138.78, 139.65, 139.77, 140.37. $^{29}$Si NMR ($CDCl_3$) δ−77.81, −77.29, −77.15, −0.50.

Preparation [((($CH_3$)$_3SiO$)$SiO_{1.5}$)$_6$]$_{\Sigma 6}$ from [((($CH_3CH_2$)$_4NO$)$SiO_{1.5}$)$_6$]$_{\Sigma 6}$: To a solution of trimethylchlorosilane (140.0 mL, 1.10 mol), heptane (500 mL), and N,N-dimethylformamide (200 mL) was added a powder of [((($CH_3CH_2$)$_4NO$)$SiO_{1.5}$)$_6$]$_{\Sigma 6}$ (11.9 g, 10.0 mmol) over a period of ca. 30 min at 0° C. After addition of all the [((($CH_3CH_2$)$_4NO$)$SiO_{1.5}$)$_6$]$_{\Sigma 4}$ the mixture was stirred for an additional 30 min then allowed to warm to room temperature overnight. An ice-water (1 L) was added and the mixture stirred for 30 min. The organic layer was washed with water until neutral, dried over $MgSO_4$, and concentrated. To the residue was added a methanol and the soluble part was removed by filtration to leave a pure [((($CH_3$)$_3SiO$)Si$O_{1.5}$)$_6$]$_{\Sigma 1}$ (4.1 g, 4.84 mmol) as a white solid in 48% yield: $^1$H NMR ($CDCl_3$) δ 0.17 (s, 54H). $^{13}$C NMR ($CDCl_3$) δ1.18. $^{29}$Si NMR ($CDCl_3$)δ14.27, −99.31.

Preparation of [((($CH_3$)$_3SiO$)$SiO_{1.5}$)$_6$(($CH_2$=$CH$)($CH_3$)$_2$Si$O_{1.0}$)$_4$]$_{\Sigma 6}$: To an $Et_2O$ (5 mL) solution of vinyldimethylchlorosilane (121.5 μL, 0.88 mmol) and $NEt_3$ (139.4 μL, 1.00 mmol) was added an $Et_2O$ solution of [((($CH_3$)$_3SiO$)$SiO_{1.5}$)$_2$((($CH_3$)$_3SiO$)(OH)$SiO_{1.0}$)$_4$]$_{\Sigma 6}$(174.7 mg, 0.20 mmol) at room temperature. The mixture was stirred at room temperature for 4 h and then concentrated under reduced pressure. The residue was extracted with hexane. The insoluble materials were filtered. The filtrate was concentrated to give a spectroscopic pure [(((CH$_3$)$_3$SiO)SiO$_{1.5}$)$_6$((CH$_2$=CH)(CH$_3$)$_2$SiO$_{1.0}$)$_4$]$_{\Sigma 6}$(225.6 mg, 0.18 mmol) as a white foam solid in 92% yield: $^1$H NMR (CDCl$_3$) δ 0.13 (s, 54H), 0.14 (s, 12H), 0.18(s, 12H), 5.73 (d, J=4.0 Hz, 2H), 5.77 (d, J=4.0 Hz, 2H), 5.91 (d, J=4.0 Hz, 2H), 5.94 (d, J=4.0 Hz, 2H), 6.11 (d, J=15.0 Hz, 2H), 6.15 (d, J=15.0 Hz, 2H). $^{13}$C NMR (CDCl$_3$) δ 0.11, 1.52, 1.62, 132.00, 138.79. $^{29}$Si NMR (CDCl$_3$) δ11.24, 10.17, −1.35, −108.31, −108.70. MS (ESI): Calcd for C$_{34}$H$_{90}$O$_{17}$Si$_{16}$Na, 1243.2. Found: 1243.6.

Preparation of [(((CH$_3$)$_3$SiO)SiO$_{1.5}$)$_6$((C$_6$H$_5$)SiO$_{1.5}$)$_1$((CH$_2$=CCH$_3$)(O)CO (CH$_2$)$_3$SiO$_{1.5}$)$_1$]$_{\Sigma 8}$ from [(((CH$_3$)$_3$SiO)SiO$_{1.5}$)$_4$((C$_6$H$_5$)(OH)SiO$_{1.0}$)$_1$(((CH$_3$)$_3$SiO) (OH)SiO$_{1.0}$)$_2$]$_{\Sigma 7}$: An Et$_2$O (8 mL) solution of methacryloxypropyltrichlorosilane (340.3 μL, 1.63 mmol) and NEt$_3$ (748.5 μL, 5.37 mmol) was added to an Et$_2$O (7 mL) solution of [(((CH$_3$)$_3$SiO)SiO$_{1.5}$)$_4$((C$_6$CH$_5$)(OH)SiO$_{1.0}$)$_1$(((CH$_3$)$_3$SiO) (OH)SiO$_{1.0}$)$_2$]$_{\Sigma 7}$ (817.0 mg, 0.81 mmol) at −35° C. and the mixture was stirred at room temperature for 6 h and then concentrated under reduced pressure. The residue was extracted with hexane, insoluble materials were filtered, and the filtrate was concentrated to give an oil. The oil was purified using a silica gel column and hexane/Et$_2$O (50:1) as an eluent. Evaporation of the volatiles gave [(((CH$_3$)$_3$SiO)SiO$_{1.5}$)$_6$((C$_6$H$_5$)SiO$_{1.5}$)$_1$((CH$_2$=CCH$_3$)(O)CO(CH$_2$)$_3$SiO$_{1.5}$)$_1$]$_{\Sigma 8}$ (210.0 mg, 0.18 mmol) as a white solid in 25% yield. $^1$H NMR (CDCl$_3$) δ0.13 (s, 18H), 0.16 (s, 18H), 0.17 (s, 9H), 0.18 (s, 9H), 0.73–0.80 (m, 2H), 1.77–1.85 (m, 2H), 1.93 (s, 3H), 4.11 (t, J=6.62 Hz, 2H), 5.54 (t, J=1.58 Hz, 1H), 6.09 (br s, 1H), 7.35–7.41 (m, 2H), 7.43–7.48 (m, 1H), 7.66–7.72 (m, 2H). $^{13}$C NMR (CDCl$_3$) δ 1.24, 7.95, 18.30, 22.11, 66.39, 125.22, 127.70, 130.22, 130.69, 134.08, 136.41, 167.37. $^{29}$Si NMR (CDCl$_3$) δ−109.06, −108.88, −108.82, −78.86, −65.60, 12.55, 12.58, 12.59. Calcd for C$_{31}$H$_{70}$O$_{26}$Si$_{14}$: C, 32.21; H, 6.10. Found: C, 31.99; H, 6.35. MS (ESI) Calcd for 1177.1 [M+Na]$^+$, 1193.1 [M+K]$^+$. Found: 1177.2 [M+Na]$^+$, 100%; $^{1193.2}$ [M+K]$^+$, 10%.

Examples for Process III

Selective Opening, Functionalization and Rearrangement of POSS Nanostructures

Preparation of [((CH$_2$=CH)SiO$_{1.5}$)$_6$((CH$_2$=CH)(HO)SiO$_{1.0}$)$_2$]$_{\Sigma 8}$ from [((CH$_2$=CH)SiO$_{1.5}$)$_8$]$_{\Sigma 8}$. An aqueous solution of NEt$_4$OH (33%, 2 mL, 0.25 mmol) in THF (10 mL, −35° C.) was added to a stirred solution of [((CH$_2$=CH)SiO$_{1.5}$)$_8$]$_{\Sigma 8}$ (2.95 g, 4.66 mmol) in 1:1:1 THF/CH$_2$Cl$_2$/isopropanol (300 mL), which was chilled in a −35° C. (1:1 methanol/water and N$_2$) cold bath. After 4.3 hours the reaction was quenched with 1M HCl (20 mL, −35° C.) and the solution was washed with 1M HCl (2×40 mL), water (2×40 mL), and sat. aq. NaCl solution (40 mL). After drying over Na$_2$SO$_4$, and removal of the solvent in vacuo (25° C., 0.01 Torr) a white solid (3.01 g, 99%) was isolated. The product [((CH$_2$=CH)SiO$_{1.5}$)$_6$((CH$_2$=CH)(HO)SiO$_{1.0}$)$_2$]$_{\Sigma 8}$ prepared by this procedure is spectroscopically pure. Additional purification can be accomplished through recrystallization from CH$_2$Cl$_2$/hexanes/acetic acid (25° C.). $^1$H NMR (CDCl$_3$, 500.2 MHz, 25° C.): δ 6.12–5.74 (m, SiCH=CH$_2$), 5.7 (br, SiOH). $^{13}$C{$^1$H} NMR (CDCl$_3$, 125.7 MHz, 25° C.): δ 137.00, 136.87, 136.81 (s, CH$_2$, rel. int. 1:1:2), 129.75, 129.17, 128.80 (s, SiCH, rel. int. 1:2:1). $^{29}$Si{$^1$H} NMR (CDCl$_3$, 99.4 MHz, 25° C.): δ −71.39 (s, SiOH), −79.25, −80.56 (s, SiCH, rel. int. 1:2). Mass Spectrum (ESI) m/z calcd for C$_{16}$H$_{26}$O$_{13}$Si$_8$: [M+H]$^+$ 650.96, found 651.2 (20%); [M+Na]$^+$ 672.94, found 673.1 (100%). Mass Spectrum (EI) m/z calculated for C$_{16}$H$_{26}$O$_{13}$Si$_8$: [M]$^+$ 649.9528, found 649.9532 (4%); [M−C$_2$H$_3$]$^+$ 622.9, found 623.2 (100%).

Preparation of [((Boc-NHCH$_2$CH$_2$CH$_2$)SiO$_{1.5}$)$_6$((Boc-NHCH$_2$CH$_2$CH$_2$)(HO)SiO$_{1.0}$)$_2$]$_{\Sigma 8}$ from [((Boc-NHCH$_2$CH$_2$CH$_2$)SiO$_{1.5}$)$_8$]$_{\Sigma 8}$: A solution of [((Boc-NHCH$_2$CH$_2$CH$_2$)SiO$_{1.5}$)$_8$]$_{\Sigma 8}$ (0.11 mmol) in 1:1:1 CH$_2$Cl$_2$/THF/isopropanol (−35° C., 7.5 mL) and aq. NEt$_4$OH (35 wt %, 50 μL, 0.13 mmol) was stirred at −35° C. for 2 h. Addition of CH$_3$CO$_2$H (0.1 mL, −35° C.), extraction with a saturated aqueous NaCl solution (3×10 mL), drying over Na$_2$O$_4$, and removal of the solvent in vacuo (25° C., 0.001 Torr) afforded [((Boc-NHCH$_2$CH$_2$CH$_2$)SiO$_{1.5}$)$_6$((Boc-NHCH$_2$CH$_2$CH$_2$)(HO)SiO$_{1.0}$)$_2$]$_{\Sigma 8}$ as a colorless paste in a 63% yield. $^{29}$Si{$^1$H} NMR (CDCl$_3$, 99.4 MHz, 25° C.): δ −57.798, −65.674, −67.419 (s, rel. int. 1:1:2). Mass Spectrum (ESI) m/z calcd for C$_{64}$H$_{130}$N$_8$O$_{29}$Si$_8$: [M+Na]$^+$ 1721.7, found 1722.1.

Preparation of [((Cbz-Pro-NHCH$_2$CH$_2$CH$_2$)SiO$_{1.5}$)$_6$((Cbz-Pro-NHCH$_2$CH$_2$CH$_2$)(HO)SiO$_{1.0}$)$_2$]$_{\Sigma 8}$ from [((Cbz-Pro-NHCH$_2$CH$_2$CH$_2$)SiO$_{1.5}$)$_8$]$_{\Sigma 8}$: A solution of [((Cbz-Pro-NHCH$_2$CH$_2$CH$_2$)SiO$_{1.5}$)$_8$]$_8$ (0.11 mmol) in 1:1:1 CH$_2$Cl$_2$/THF/isopropanol (−35° C., 7.5 mL) and aq. NEt$_4$OH (35 wt %, 50 μL, 0.13 mmol) was stirred at −35° C. for 2 h. Addition of CH$_3$CO$_2$H (0.1 mL, −35° C.), extraction with a saturated aqueous NaCl solution (3×10 mL), drying over Na$_2$SO$_4$, and removal of the solvent in vacuo (25° C., 0.001 Torr) afforded [((Cbz-Pro-NHCH$_2$CH$_2$CH$_2$)SiO$_{1.5}$)$_6$((Cbz-Pro-NHCH$_2$CH$_2$CH$_2$)(HO)SiO$_{1.0}$)$_2$]$_{\Sigma 8}$ as a colorless paste in 77% yield. $^{29}$Si({$^1$H} NMR (CDCl$_3$, 99.4 MHz, 25° C.): δ−58.4, −65.543, −67.470 (s, rel. int. 1:1:2). Mass Spectrum (ESI) m/z calcd for C$_{128}$H$_{170}$N$_{16}$O$_{37}$Si$_8$: [M+Na]$^+$ 2772.54, found 2772.9.

Preparation of [((MeO$_2$CCH$_2$CMe$_2$CH$_2$CH$_2$CH$_2$)SiO$_{1.5}$)$_6$((MeO$_2$CCH$_2$CMe$_2$CH$_2$CH$_2$CH$_2$)(HO)SiO$_{1.0}$)$_2$]$_{\Sigma 8}$ from [((MeO$_2$CCH$_2$CMe$_2$CH$_2$CH$_2$CH$_2$)SiO$_{1.5}$)$_8$]$_{\Sigma 8}$: A solution of [((MeO$_2$CCH$_2$CMe$_2$CH$_2$CH$_2$CH$_2$)SiO$_{1.5}$)$_8$]$_{\Sigma 8}$ (0.11 mmol) in 1:1:1 CH$_2$Cl$_2$/THF/isopropanol (−35° C., 7.5 mL) and aq. NEt$_4$OH (35 wt %, 50 μL, 0.13 mmol) was stirred at −35° C. for 2 h. Addition of CH$_3$CO$_2$H (0.1 mL, −35° C.), extraction with a saturated aqueous NaCl solution (3×10 mL), drying over Na$_2$SO$_4$, and removal of the solvent in vacuo (25° C., 0.001 Torr) afforded [((MeO$_2$CCH$_2$CMe$_2$CH$_2$CH$_2$CH$_2$)SiO$_{1.5}$)$_6$((MeO$_2$CCH$_2$CMe$_2$CH$_2$CH$_2$CH$_2$)(HO) SiO$_{1.0}$)$_2$]$_{\Sigma 8}$ as a colorless paste in 66% yield. $^{29}$Si{$^1$H} NMR (CDCl$_3$, 99.4 MHz, 25° C.): δ−57.551, −64.981, −66.841 (s, rel. int. 1:1:2). Mass Spectrum (ESI) m/z calculated for C$_{64}$H$_{122}$O$_{29}$Si$_8$: [M+Na]$^+$ 1601.61, found 1602.0.

Preparation of [(((CH$_3$)$_3$SiO)SiO$_{1.5}$)$_2$(((CH$_3$)$_3$SiO)(OH)SiO$_{1.0}$)$_4$]$_{\Sigma 6}$: To a THF (4 mL) solution of [(((CH$_3$)$_3$SiO)SiO$_{1.5}$)$_6$]$_{\Sigma 6}$ (169.5 mg, 0.20 mmol) was added an aqueous solution of NEt$_4$OH (35%, 82.3 μL, 0.20 mmol) at −40° C. The resulting mixture was stirred between −40 to −25° C. for 40 min. The mixture was neutralized with aqueous solution of HCl (1N, 3 mL) and extracted with diethyl ether. The organic layer was washed with brine, dried over MgSO$_4$, and evaporated to give a spectroscopic pure [(((CH$_3$)$_3$SiO)SiO$_{1.5}$)$_2$(((CH$_3$)$_3$SiO)(OH)SiO$_{1.0}$)$_4$]$_{\Sigma 6}$ (174.7 mg, 0.20 mmol) as a white wax solid in 99% yield. $^1$H NMR (CDCl$_3$) δ 0.14 (s, 54H). $^{13}$C NMR (CDCl$_3$) δ 1.24, 1.28. $^{29}$Si NMR (CDCl$_3$) δ 12.44, 12.19, −100.12, −109.27.

Preparation of [(((H$_3$C)$_3$SiO)SiO$_{1.5}$)$_6$(((H$_3$C)$_3$SiO)(OH)SiO$_{1.0}$)$_2$(((CH$_2$=CH) (OH)SiO$_{1.0}$)$_1$]$_{\Sigma 7}$: The starting polyhedral oligomeric silicate [(((H₃C)₃SiO)SiO₁.₅)₆]$_{\Sigma 6}$ was prepared via a procedure analogous to that published by Harrison et al. *Main Group Metals Chemistry* (1997) vol 20, pp. 137–141. A solution of Vinyltrimethoxysilane (0.04 mL, 0.26 mmol) and aqueous NEt₄OH (0.1 mL, 0.25 mmol) was prereacted for 10 minutes and then added to a solution of [(((H₃C)₃SiO)SiO₁.₅)₆]$_{\Sigma 6}$ (198 mg, 0.23 mmol) and was stirred for 15 minutes at room temperature. The reaction was then neutralized through the addition of dilute HCl and the solvent was removed under reduced pressure. The residue was then taken up in diethylether filtered and dried over anhydrous MgSO₄. Filtration and evaporation of the solvent afforded a yellow oil (2.31 mg, 0.002 mol) in 10.2% yield. Selected characterization data: $^{29}$Si{$^{1}$H} NMR (99.3 MHz, CDCl₃, 25° C.) δ –99.8, –100.1, –108.0, –108.9. MS (ESI, 100% MeOH): m/e 977.1 ({M+Na}⁺.

Preparation of [((CH₃CH₂)SiO₁.₅)₆((CH₃CH₂)(HO)SiO₁.₀)₂]$_{\Sigma 8}$ from [((CH₃CH₂)SiO₁.₅)₈]$_{\Sigma 8}$: A CH₂Cl₂/i-PrOH/THF(10/10/10 mL) solution of [((CH₃CH₂)SiO₁.₅)₈]$_{\Sigma 8}$ (259.7 mg, 0.40 mmol) was added an aqueous solution of Et₄NOH (35%, 493.5 μL, 1.20 mmol) at –20° C. After addition the resulting mixture was stirred at the same temperature for 7 h. The mixture was neutralized with 1N HCl solution and extracted with diethyl ether. The organic layer was washed with brine, dried over Na₂SO₄. Evaporation of the volatiles gave spectroscopically pure [((CH₃CH₂)SiO₁.₅)₆((CH₃CH₂)(HO)SiO₁.₀)₂]$_{\Sigma 8}$ (263.5 mg, 0.39 mmol) as a white solid in 99% yield. $^{1}$H NMR (CDCl₃) δ 0.54–0.66 (m, 16H), 0.93–1.04 (m, 24H), 5.21 (br s, 2H). $^{13}$C NMR (CDCl₃) δ 3.94, 4.36, 4.41, 6.42, 6.46, 6.50. $^{29}$Si NMR (CDCl₃) δ–66.73, –64.95, –57.63. Calcd for C₁₆H₄₂O₁₃Si₈: C, 28.80; H, 6.35. Found: C, 28.78; H, 6.43.

Preparation of [(((CH₃)₂CH)SiO₁.₅)₆(((CH₃)₂CH)(HO)SiO₁.₀)₂]$_{\Sigma 8}$ from [(((CH₃)₂CH)SiO₁.₅)₈]$_{\Sigma 8}$: [(((CH₃)₂CH)SiO₁.₅)₈]$_{\Sigma 8}$ (302 mg, 0.397 mmol) was dissolved in 15 mL of solvents' mixture (iso-propanol:CH₂Cl₂:THF=1:1:1). The aqueous 35% solution of EtN₄OH (0.8 mL) was added to the solution of [(((CH₃)₂CH)SiO₁.₅)₈]$_{\Sigma 8}$ at –12° C. After 7 hours, the reaction mixture was decanted, extracted with Et₂O (4×3 mL). The extract was dried over anhydrous Na₂SO₄, then evaporated in vacuo, obtained a yellow solid which was purified by column chromatography (SiO₂, 60% CH₂Cl₂ in hexanes) to afford a spectroscopically pure powder (189 mg, 61%). $^{1}$H NMR (500 MHz, CDCl₃, 25° C.): δ 3.90 (br s, SiOH, 2H), 1.03 (br m's, 48H), 0.91 (br m's, 8H. $^{13}$C{$^{1}$H} NMR (125 MHz, CDCl₃, 25° C.): δ 16.91, 16.79, 16.64 (8:4:4 for CH₃), 11.91, 11.77, 11.38 (4:2:2 for CH), $^{29}$Si{$^{1}$H} NMR (99 MHz, CDCl₃, 25° C.): δ–57.92, –65.29, –67.70 (2:2:4). IR (25° C., KBr, cm⁻¹): 3352, 2950, 2869, 1466, 1260, 1112. MS (ESI, 100% MeOH): m/e 802.0 {[M+Na]⁺, 100%}, 779.1 (M⁻, 70%). Anal. Calculated for C₂₄H₅₇O₁₃Si₈ (found): C, 37.03 (36.92), H, 7.38 (7.54).

Preparation of [((c-C₆H₉)SiO₁.₅)₄((c-C₆H₉)(OH)SiO₁.₀)₂((CH₂=CH)(OH)SiO₁.₀)₁]$_{\Sigma 7}$: A solution of 35% aqueous NEt₄OH (0.1 mL, 0.25 mmol) was added to a solution of [(c-C₆H₉)SiO₁.₅]$_{\Sigma 6}$ (205 mg, 0.25 mmol) and VinylSi(OMe)₃ in THF (2.5 mL). The solution was stirred for 1 h then neutralized with dilute aqueous HCl. Evaporation of the volatiles afforded a white resin, which was dissolved in Et₂O and dried over anhydrous MgSO₄. Filtration and evaporation of the solvent afforded a white solid in high mass yield. Analysis by multinuclear NMR spectroscopy and electrospray mass spectrometry indicated that the product mixture contained a ~6:1 mixture of [((c-C₆H₉)SiO₁.₅)₂((c-C₆H₉)(OH)SiO₁.₀)₄] and [((c-C₆H₉)SiO₁.₅)₄((c-C₆H₉)(OH)SiO₁.₀)₂((CH₂=CH)(OH)SiO₁.₀)₁]$_{\Sigma 7}$. Selected characterization data: $^{29}$Si{$^{1}$H} NMR (99.3 MHz, CDCl₃, 25° C.) δ–60.1 (s, 2 Si, Cy—Si—OH), –68.2 (s, 1 Si), –69.1 (s, 2 Si), –69.7 (s, 1 Si), –72.0 (s, 1 Si, V—Si—OH). $^{1}$H NMR (500 MHz, CDCl₃, 25° C.) δ 5.90 (m, 3H, —CH=CH₂); 1.65, 1.16 (m, 66H, C₅H₁₁). $^{13}$C{$^{1}$H} NMR (125.8 MHz, C₆D₆, 25° C.) δ 135.4 (s, =CH₂); 130.4 (s, —CH=); 27.53, 27.47, 26.82, 26.67, 26.59, 26.56 (s, CH₂); 23.81, 23.59, 23.36, 23.10 (s, CH). MS (ESI, 100% MeOH): m/e 917 ([M+H]⁺, 75%); 939 ([M+Na]⁺, 100.

Reaction of [((c-C₆H₁₁)SiO₁.₅)₆]$_{\Sigma 6}$ with NEt₄OH at room temperature: A solution of [((c-C₆H₁₁)SiO₁.₅)₆]$_{\Sigma 6}$ (200 mg, 0.24 mmol) and 35% aqueous NEt₄OH (0.1 mL, 0.25 mmol) in THF (2.5 mL) was stirred at 25° C. for 4 h then neutralized with dilute aqueous HCl. Evaporation of the volatiles afforded a white solid, which was dissolved in Et₂O and dried over anhydrous MgSO₄. Filtration and evaporation of the solvent afforded a white solid in high mass yield. Analysis of the product mixture by $^{29}$Si NMR spectroscopy indicated that it contained mainly [((c-C₆H₁₁)SiO₁.₅)₂(c-C₆H₁₁)(OH)SiO₁.₀)₄]$_{\Sigma 6}$ (>60%) and [((c-C₆H₁₁)SiO₁.₅)₄(c-C₆H₁₁)(OH)SiO₁.₀)₃]$_{\Sigma 7}$ (>30%).

Preparation of [((c-C₆H₁₁)SiO₁.₅)₆((c-C₆H₁₁)(OH)SiO₁.₀)₂]$_{\Sigma 8}$ from [((c-C₆H₁₁)SiO₁.₅)₈]$_{\Sigma 8}$: A solution of [((c-C₆H₁₁)SiO₁.₅)₈]$_{\Sigma 8}$ (250 mg, 0.23 mmol) and 35% aqueous NEt₄OH (0.1 mL, 0.25 mmol) in THF (3 mL) was stirred at room temperature for 1 h and then neutralized with an aqueous solution of HCl. The volatiles were evaporated in vacuo to afford a white solid, which was dissolved in Et₂O and dried over anhydrous MgSO₄. Filtration and evaporation of the solvent afforded a white microcrystalline solid in high yield. Analysis by $^{29}$Si NMR spectroscopy and electrospray MS indicated that the product mixture contained ~76% (by $^{29}$Si NMR) [((c-C₆H₁₁)SiO₁.₅)₆((c-C₆H₁₁)(OH)SiO₁.₀)₂]$_{\Sigma 8}$: $^{29}$Si{$^{1}$H} NMR (99.3 MHz, C₆D₆, 25° C.) δ–60.4, –67.2, –69.8 (s, 1:1:2), as well as smaller amounts of unreacted [((c-C₆H₁₁)SiO₁.₅)₈]$_{\Sigma 8}$ (δ–68.2, ~20%). Small $^{29}$Si NMR resonances attributable to tetrasilanol [((c-C₆H₁₁)SiO₁.₅)₆((c-C₆H₁₁)(OH)SiO₁.₀)₂]$_{\Sigma 8}$ were also observed, as well as prominent peaks in the electrospray mass spectrum for the [((c-C₆H₁₁)SiO₁.₅)₆((c-C₆H₁₁)(OH)SiO₁.₀)₂]$_{\Sigma 8}$ (1117.36 for the ion with H+ and 1139 for the ion with Na+). Spectroscopic data for [((c-C₆H₁₁)SiO₁.₅)₆((c-C₆H₁₁)(OH)SiO₁.₀)₂]$_{\Sigma 8}$ matched the data previously reported for this compound.

Preparation of [((c-C₆H₁₁)SiO₁.₅)₄((c-C₆H₁₁)(OH)SiO₁.₀)₃]$_{\Sigma 7}$ from [((c-C₆H₁₁)SiO₁.₅)₈]$_{\Sigma 8}$: A solution of [((c-C₆H₁₁)SiO₁.₅)₈]$_{\Sigma 8}$ (500 mg, 0.46 mmol) and 35% aqueous NEt₄OH (0.2 mL, 0.49 mmol) was refluxed in THF (5 mL) for 4 h then neutralized with dilute aqueous HCl. Evaporation of the volatiles afforded a white solid, which was dissolved in Et₂O and dried over anhydrous MgSO₄. Filtration and evaporation of the solvent afforded [((c-C₆H₁₁)SiO₁.₅)₄((c-C₆H₁₁)(OH)SiO₁.₀)₃]$_{\Sigma 7}$ as a white microcrystalline solid in 23% yield. Spectroscopic data for the product matched the data previously reported for samples of [((c-C₆H₁₁)SiO₁.₅)₄((c-C₆H₁₁)(OH)SiO₁.₀)₃]$_{\Sigma 7}$ obtained via the hydrolytic condensation of c-C₆H₁₁SiCl₃.

Preparation of [((c-C₆H₁₁)SiO₁.₅)₂((c-C₆H₁₁)(OH)SiO₁.₀)₄]$_{\Sigma 6}$ from [((c-C₆H₁₁)SiO₁.₅)₈]$_{\Sigma 8}$: A solution of [((c-C₆H₁₁)SiO₁.₅)]$_{\Sigma 8}$ (200 mg, 0.24 mmol) and 35% aqueous NEt₄OH (0.2 mL, 0.49 mmol) in THF (5 mL) was stirred at 25° C. for 1 h then neutralized with dilute aqueous HCl. Evaporation of the volatiles afforded a white solid, which was dissolved in Et₂O and dried over anhydrous MgSO₄. Filtration and evaporation of the solvent afforded [((c-C₆H₁₁)SiO₁.₅)₂((c-C₆H₁₁)(OH)SiO₁.₀)₄]$_{\Sigma 6}$ as a white solid in 63% yield (135 mg). $^{29}$Si{$^{1}$H} NMR (99.3 MHz, CDCl₃, 25° C.) δ–59.4, –68.8 (s, 2:1). $^{1}$H NMR (500 MHz, CDCl₃, 25° C.) δ 1.78 (v br m); 1.7 (v br m). $^{13}C\{^1H\}$ NMR (125.8 MHz, CDCl$_3$, 25° C.) δ=27.55, 27.47, 26.86, 26.62(CH$_2$); 23.68, 23.16 (2:1, SiCH). MS (ESI, 100% MeOH): m/e 846 (M+H$^+$, 48%); M+Na$^+$, 95%); 885 (M$^+$+H+K, 100%).

Preparation of [((C$_6$H$_5$CH=CH)SiO$_{1.5}$)$_6$ ((C$_6$H$_5$CH=CH)(OH)SiO$_{1.0}$)$_2$]$_{\Sigma 8}$ from [((C$_6$H$_5$CH=CH) SiO$_{1.5}$)$_8$]$_{\Sigma 8}$: A CH$_2$Cl$_2$/i-PrOH/THF(4/4/4 mL) solution of [((C$_6$H$_5$CH=CH)SiO$_{1.5}$)$_8$]$_{\Sigma 8}$ (124.2 mg, 0.10 mmol) was added an aqueous solution of Et$_4$NOH (35%, 49.4 mL, 0.12 mmol) at −35° C. After addition the resulting mixture was stirred at the same temperature for 5 h. The mixture was neutralized with 1N HCl solution and extracted with diethyl ether. The organic layer was washed with brine, dried over Na$_2$SO$_4$, and evaporated. The residue was passed through a silica gel column using hexane/Et$_2$O (2:1) as an eluent. Evaporation of the volatiles gave pure [((C$_6$H$_5$CH=CH) SiO$_{1.5}$)$_6$((C$_6$H$_5$CH=CH)(OH)SiO$_{1.0}$)$_2$]$_{\Sigma 8}$ (112.4 mg, 0.09 mmol) as a white solid in 89% yield. $^1$H NMR (CDCl$_3$) δ 5.83 (br s, 2H), 6.31–6.45 (m, 16H), 7.21–7.59 (m, 40H). $^{13}$C NMR (CDCl$_3$) δ 117.41, 117.76, 117.96, 126.90, 128.43, 128.50, 128.53, 128.75, 128.83, 128.90, 137.17, 137.23, 137.29, 149.11, 149.15, 149.21. $^{29}$Si NMR (CDCl$_3$) δ−78.05, −77.05, −68.66.

Preparation of [((C$_6$H$_5$CH$_2$CH$_2$SiO$_{1.5}$)$_6$((C$_6$H$_5$CH$_2$CH$_2$) (OH)SiO$_{1.0}$)$_2$]$_{\Sigma 8}$ from [((C$_6$H$_5$CH$_2$CH$_2$)SiO$_{1.5}$)$_8$]$_{\Sigma 8}$: A CH$_2$Cl$_2$/i-PrOH/THF (5/5/5 mL) solution of [((C$_6$H$_5$CH$_2$CH$_2$)SiO$_{1.5}$)$_8$]$_{\Sigma 8}$ (251.6 mg, 0.20 mmol) was added an aqueous solution of Et$_4$NOH (35%, 247.0 L, 0.60 mmol) at −35° C. After addition the resulting mixture was stirred at the same temperature for 4 h. The mixture was neutralized with 1N HCl solution and extracted with diethyl ether. The organic layer was washed with brine, dried over MgSO$_4$, and evaporated. The residue was passed through a silica gel column using hexane/Et$_2$O (2:1) as an eluent. Evaporation of the volatiles gave pure [((C$_6$H$_5$CH$_2$CH$_2$SiO$_{1.5}$)$_6$((C$_6$H$_5$CH$_2$CH$_2$)(OH)SiO$_{1.0}$)$_2$]$_{\Sigma 8}$ (225.3 mg, 0.18 mmol) as a colorless oil in 88% yield. $^1$H NMR (CDCl$_3$) δ 1.11–1.25 (m, 16H), 2.86–2.98 (m, 16H), 5.24 (br s, 2H), 7.25–7.47 (m, 40H). $^{13}$C NMR (CDCl$_3$) δ 13.56, 14.19, 14.30, 28.80, 28.95, 28.98, 125.74, 125.84, 127.71, 127.83, 128.29, 128.33, 128.42, 143.67, 143.75, 143.78. $^{29}$Si NMR (CDCl$_3$) δ −7.75, −65.99, −58.35.

Preparation of [((CH$_3$C$_6$H$_4$SiO$_{1.5}$)$_6$((CH$_3$C$_6$H$_5$)(OH) SiO$_{1.0}$)$_2$]$_{\Sigma 8}$ from [((CH$_3$C$_6$H$_5$)SiO$_{1.5}$)$_8$]$_{\Sigma 8}$: A procedure similar to that used for [((C$_6$H$_5$CH$_2$CH$_2$SiO$_{1.5}$)$_6$ ((C$_6$H$_5$CH$_2$CH$_2$)(OH)SiO$_{1.0}$)$_2$]$_{\Sigma 8}$ was used to produce [((CH$_3$C$_6$H$_4$SiO$_{1.5}$)$_6$((CH$_3$C$_6$H$_5$)(OH)SiO$_{1.0}$)$_2$]$_{\Sigma 8}$. $^1$H NMR (CDCl$_3$) δ 2.36 (s, 6H), 2.41 (s, 12H), 2.42 (s, 6H), 6.03 (br s, 2H), 7.08 (d, $^3$J=7.5 Hz, 4H), 7.16 (d, $^3$J=7.5 Hz, 8H), 7.24 (d, $^3$J=7.5 Hz, 4H), 7.56 (d, $^3$J=7.5 Hz, 4H), 7.62 (d, $^3$J=7.5 Hz, 8H), 7.72 (d, $^3$J=7.5 Hz, 4H). $^{13}$C NMR (CDCl$_3$) δ 21.50, 21.53, 21.56, 127.10, 127.29, 127.65, 128.41, 128.48, 128.53, 134.25, 140.26, 140.31, 140.56. $^{29}$Si NMR (CDCl$_3$) δ −78.22, −76.86, −69.05. MS (ESI, 100% MeOH): m/z Calcd for C$_{56}$H$_{58}$O$_{13}$Si$_8$Na (100%): 1185.2. Found: 1185.4. C$_{56}$H$_{58}$O$_{13}$Si$_8$H (20%): 1163.2. Found: 1163.5. C$_{56}$H$_{58}$O$_{13}$Si$_8$K (20%): 1201.2. Found: 1201.3.

Preparation of [(c-C$_6$H$_{11}$SiO$_{1.5}$)$_6$((c-C$_6$H$_{11}$)(OH)Si O$_{1.0}$)$_2$]$_{\Sigma 8}$ from [(c-C$_6$H$_{11}$SiO$_{1.5}$)$_8$]$_{\Sigma 8}$: A THF (100 mL) solution of [(c-C$_6$H$_{11}$SiO$_{1.5}$)$_8$]$_{\Sigma 8}$ (5.41 g, 5.00 mmol) was added a methanol solution of Me$_4$NOH (25%, 1.90 mL, 4.50 mmol) at room temperature. After addition the resulting mixture was stirred at the same temperature for 1 h. The mixture was neutralized with 1N HCl solution and extracted with diethyl ether. The organic layer was washed with brine, dried over MgSO$_4$, and evaporated. The residue was passed through a silica gel column using hexane and CH$_2$Cl$_2$ as an eluent. Evaporation of the volatiles gave pure [(c-C$_6$H$_{11}$SiO$_{1.5}$)$_6$((c-C$_6$H$_{11}$)(OH)SiO$_{1.0}$)$_2$]$_{\Sigma 8}$ (4.60 g, 4.18 mmol) as a white solid in 84% yield. $^1$H NMR (500 MHz, CDCl$_3$, 25° C.): δ 4.30 (br s, SiOH, 2H), 1.76 (br m's, 40H), 1.23 (br m's, 40H), 0.74 (br m's, 8H). $^{13}C\{^1H\}$ NMR (125 MHz, CDCl$_3$, 25° C.): δ 27.55, 27.48, 26.88, 26.79, 26.58, 26.53 (CH$_2$), 23.79, 23.69, 23.07 (4:2:2 for CH), $^{29}Si\{^1H\}$ NMR (99 MHz, CDCl$_3$, 25° C.): δ−59.91, −67.60, −69.85 (2:2:4). IR (25° C., KBr, cm$^{-1}$): 2916, 2838, 1447, 1197, 1109. MS (70 eV, 200° C., relative intensity): m/e 1015 ([M—(C$_6$H$_{11}$)]$^+$, 100). Anal. Calcd for C$_{48}$H$_{90}$O$_{13}$Si$_8$, (found): C, 52.42 (52.32), H, 8.25 (8.68).

Reaction of [((CH$_3$)$_2$CHCH$_2$)SiO$_{1.5}$)$_8$]$_{\Sigma 8}$ with NEt$_4$OH at room temperature. A solution of 35% NEt$_4$OH in water (0.11 mL, 0.25 mmol) was added to a THF (5 mL) solution of [((CH$_3$)$_2$CHCH$_2$)SiO$_{1.5}$)$_8$]$_{\Sigma 8}$ (0.20 g, 0.23 mmol). The solution was stirred at room temperature for 1 h and then neutralized with an aqueous solution of HCl. The THF was removed in vacuo to afford a white oil, which was dissolved in Et$_2$O, dried over anhydrous MgSO$_4$ and filtered. Evaporation of the solvent afforded in 85% mass yield a milky white oil containing (by $^{29}$Si NMR spectroscopy and ESI MS) unreacted [((CH$_3$)$_2$CHCH$_2$)SiO$_{1.5}$)$_8$]$_{\Sigma 8}$ (9%), [((CH$_3$)$_2$CHCH$_2$)SiO$_{1.5}$)$_4$((CH$_3$)$_2$CHCH$_2$)(OH)SiO$_{1.0}$)$_3$]$_{\Sigma 7}$ (29%), [((CH$_3$)$_2$CHCH$_2$)SiO$_{1.5}$)$_6$((CH$_3$)$_2$CHCH$_2$)(OH)SiO$_{1.0}$)$_2$]$_{\Sigma 8}$ (13%) and [((CH$_3$)$_2$CHCH$_2$)SiO$_{1.5}$)$_4$((CH$_3$)$_2$CHCH$_2$)(OH) SiO$_{1.0}$)$_4$]$_{\Sigma 8}$ (34%). Selected characterization data for [((CH$_3$)$_2$CHCH$_2$)SiO$_{1.5}$)$_8$]$_{\Sigma 8 2}$: $^{29}Si\{^1H\}$ NMR (99.3 MHz, C$_6$D$_6$, 25° C.) δ−67.6; MS (ESI, 100% MeOH): m/e 873 (M+H$^+$, 5%). For [((CH$_3$)$_2$CHCH$_2$)SiO$_{1.5}$)$_4$((CH$_3$)$_2$CHCH$_2$) (OH)SiO$_{1.0}$)$_3$]$_{\Sigma 7}$: $^{29}Si\{^1H\}$ NMR (99.3 MHz, C$_6$D$_6$, 25° C.) δ−58.9, −67.1, −8.5 (3:1:3); MS (ESI, 100% MeOH): m/e: $_3$ 791 (M+H$^+$, 2%) and 813 (M+Na$^+$, 5%). For [((CH$_3$)$_2$CHCH$_2$)SiO$_{1.5}$)$_6$((CH$_3$)$_2$CHCH$_2$)(OH)SiO$_{1.0}$)$_2$]$_{\Sigma 8}$: $^{29}Si\{^1H\}$ NMR (99.3 MHz, C$_6$D$_6$, 25° C.) δ−59.6, −66.8, −68.7 (1:1:2); MS (ESI, 100% MeOH): m/e 891 (M+H$^+$, 11%) and 913 (M+Na$^+$, 5%). For [((CH$_3$)$_2$CHCH$_2$)SiO$_{1.5}$)$_4$ ((CH$_3$)$_2$CHCH$_2$)(OH)SiO$_{1.0}$)$_4$]$_{\Sigma 8}$: $^{29}Si\{^1H\}$ NMR (99.3 MHz, C$_6$D$_6$, 25° C.) δ−58.4, −56.6, −66.5, −68.3, 1:1:1:1); MS (ESI, 100% MeOH): m/e 909 (M+H$^+$, 15%) and 931 (M+Na$^+$, 100%).

Preparation of [((CH$_3$)$_2$CHCH$_2$)SiO$_{1.5}$)$_4$((CH$_3$)$_2$CHCH$_2$) (OH)SiO$_{1.0}$)$_3$]$_{\Sigma 7}$ from [((CH$_3$)$_2$CHCH$_2$)SiO$_{1.5}$)]$_{\Sigma 8}$: A solution of [((CH$_3$)$_2$CHCH$_2$)SiO$_{1.5}$)]$_{\Sigma 8}$ (400 mg, 0.46 mmol) and 35% aqueous NEt$_4$OH (0.2 mL, 0.49 mmol) was refluxed in THF (5 mL) for 4 h then neutralized with dilute aqueous HCl. Evaporation of the volatiles afforded a white resin, which was dissolved in Et$_2$O and dried over anhydrous MgSO$_4$. Filtration and evaporation of the solvent afforded crude [((CH$_3$)$_2$CHCH$_2$)SiO$_{1.5}$)$_4$((CH$_3$)$_2$CHCH$_2$)(OH) SiO$_{1.5}$)$_3$]$_{\Sigma 7}$ as a white resinous substance in 44% yield. Colorless crystals were obtained by recrystallization from acetonitrile/toluene. Selected characterization data for [((CH$_3$)$_2$CHCH$_2$)SiO$_{1.5}$)$_4$((CH$_3$)$_2$CHCH$_2$)(OH)SiO$_{1.0}$)$_3$]$_{\Sigma 7}$: $^{29}Si\{^1H\}$ NMR (99.3 MHz, C$_6$D$_6$, 25° C.) δ −58.5, −66.9, −68.3 (s, 3:1:3). $^1$H NMR (500 MHz, C$_6$D$_6$, 25° C.) δ 2.21 (m, 7H, —CH—); 1.24 (d, J=6.6 Hz, 18H, CH$_3$); 1.21 (d, J=6.6 Hz, 18H, CH$_3$); 1.17 (d, J=6.6 Hz, 6H, CH$_3$); 0.97 (d, J=7.1 Hz, 6H, CH$_2$); 0.95 (d, J=7.1 Hz, 6H, CH$_2$); 0.92 (d, J=7.0 Hz, 2H, CH$_2$). $^3C\{^1H\}$ NMR (125.8 MHz, C$_6$D$_6$, 25° C.) δ=25.7 (s, CH$_3$); 25.6 (s, CH$_3$); 25.5 (s, CH$_3$); 24.1 (s, CH$_2$); 24.05 (s, CH$_2$); 24.0 (s, CH$_2$); 23.4 (s, CH); 23.0 (s, CH); 22.6 (s, CH). MS (ESI, 100% MeOH): m/e 791.16 (M+H$^+$, 80%); 813.08 (M+Na$^+$, 100%). A single crystal X-ray diffraction study was also performed.

Preparation of [((CH$_3$)$_2$CHCH$_2$)SiO$_{1.5}$)$_6$((CH$_3$)$_2$CHCH$_2$) (OH)SiO$_{1.0}$)$_2$]$_{\Sigma 8}$ from [((CH$_3$)$_2$CHCH$_2$)SiO$_{1.5}$)$_8$]$_{\Sigma 8}$: A reactor was charged with 2126 g (2.438 moles) [((CH$_3$)$_2$CHCH$_2$)SiO$_{1.5}$)$_8$]$_{\Sigma 8}$ and 20 L THF. A basic solution of Me$_4$NOH (48 mL, 25 wt %, in MeOH) and THF (4 L) was cooled to 0° C. and added slowly (3.5 hours) to the reaction followed by 1 hour of stirring. Product formation was monitored by HPLC and upon completion was quenched into 320 mL conc. HCl and 700 mL H$_2$O at 0° C. Evaporation of the resulting solution gave waxy solids, that were washed with water until a pH=7 and recrystallized using acetone and acetonitrile to produce 1525 g (70% yld) of product at 98% purity. $^1$H NMR (CDCl$_3$): 3.99 (2H, 2×OH, bs); 1.85 (8H, 8×CH, m); 0.95 (48H, 16×CH$_3$, m); 0.60 (16H, 8×CH$_2$, m). {$^1$H} $^{13}$C NMR (CDCl$_3$): 25.80; 25.75; 25.65; 23.99; 23.93; 23.86; 23.07; 22.46. Note that the above procedure can be adapted to both continuous and batch production methods to produce the desired product higher yield and greater purity.

Preparation of [((CH$_3$)$_2$CH$_2$CHCH$_3$CH$_2$)SiO$_{1.5}$)$_6$((CH$_3$)$_2$CHCH$_2$)(OH)SiO$_{1.0}$)$_2$]$_{\Sigma 8}$ from [((CH$_3$)$_2$CH$_2$CHCH$_3$CH$_2$)SiO$_{1.5}$)]$_{\Sigma n}$ n=8, 10: A reactor was charged with 128.0 g (96.82 mmol [((CH$_3$)$_2$CH$_2$CHCH$_3$CH$_2$)SiO$_{1.5}$)]n and 2080 mL THF. A basic solution 48 mL (25 wt %, in MeOH) of Me$_4$NOH was cooled to 0° C. and added to the reaction mixture over 45 minutes and stirred for an additional 1.5 hour. Reaction progress was monitored by HPLC and at completion the reaction was quenched into HCl (150 mL, 1N) and hexane (500 mL) with rapid stirring over a period of 1 hour. The top layer was removed and evaporated to give 125.7 g (97%) of the colorless liquid product. $^1$H NMR (CDCl$_3$): 1.83 (9.3, bm); 1.27 (9.8, bm); 1.15 (10, bm); 1.00 (23, m); 0.89 (64, s); 0.85 (7.7, s); 0.73 (8.1, bm); 0.58 (8.0, bm). {$^1$H} $^{13}$C. NMR (CDCl$_3$): 54.50; 54.37; 31.19; 30.22; 29.48; 25.59; 25.49; 25.30; 25.22; 25.00; 24.36; 24.29.

Preparation of [((CH$_3$)$_2$CH$_2$CHCH$_3$CH$_2$)SiO$_{1.5}$)$_4$((CH$_3$)$_2$CHCH$_2$)(OH)SiO$_{1.0}$)$_3$]$_{\Sigma 7}$ from [((CH$_3$)$_2$CH$_2$CHCH$_3$CH$_2$)SiO$_{1.5}$)]$_{\Sigma n}$ n=8, 10: A similar procedure to that reported above for [((CH$_3$)$_2$CH$_2$CHCH$_3$CH$_2$)SiO$_{1.5}$)$_6$((CH$_3$)$_2$CHCH$_2$)(OH)SiO$_{1.0}$)$_2$]$_{\Sigma 8}$ can be using LiOH in acetone to prepare an oily trisilanol product that contains 95% of two trisilanol species [((CH$_3$)$_2$CH$_2$CHCH$_3$CH$_2$)SiO$_{1.5}$)$_4$((CH$_3$)$_2$CHCH$_2$)(OH)SiO$_{1.0}$)$_3$]$_{\Sigma 7}$ and [((CH$_3$)$_2$CH$_2$CHCH$_3$CH$_2$)SiO$_{1.5}$)$_6$((CH$_3$)$_2$CHCH$_2$)(OH)SiO$_{1.0}$)$_3$]$_{\Sigma 9}$ $^1$H NMR (500 MHz, CDCl$_3$): δ(ppm) 0.562 (m, 1H), 0.755 (m, 1H), 0.908 (s, 9H), 1.002 (m, 3H), 1.137 (m, 1H), 1.303 (m, 1H), 1.831 (m, 1 H), 6.240 (br, 3H); $^{13}$C NMR (125 MHz, CDCl$_3$): δ(ppm) 24.06, 24.51, 24.86, 25.44, 25.59, 25.65, 25.89, 29.65, 29.90, 30.64, 30.68, 31.59, 32.02, 54.28, 54.77; $^{29}$Si NMR (99.4 MHz, CDCl$_3$): δ(ppm) −68.66, −68.43, −67.54, −67.32, −58.75, −57.99. EIMS: m/e 1382 (22%, M$^+$(T$_9$)-iOct-H$_2$O), 1052 (100%, M$^+$(T$_7$)-iOct-H$_2$O).

Preparation [((CH$_3$CH$_2$)SiO$_{1.5}$)$_4$((CH$_3$CH$_2$)(OH)SiO$_{1.0}$)$_3$]$_{\Sigma 7}$ from [((CH$_3$CH$_2$)SiO$_{1.5}$)]$_{\Sigma 8}$: A solution of 35% NEt$_4$OH in water (0.2 mL, 0.49 mmol) was added to a THF (5 mL) solution of [((CH$_3$CH$_2$)SiO$_{1.5}$)]$_{\Sigma 8}$ (0.41 g, 0.46 mmol). The solution was refluxed for 7 h and then neutralized with an aqueous solution of HCl. The THF was removed in vacuo affording a colorless oil, which is dissolved in Et$_2$O and dried over MgSO$_4$ anhydrous. Evaporation of the solvent in vacuo and crystallization from MeOH afforded [((CH$_3$CH$_2$)SiO$_{1.5}$)$_4$((CH$_3$CH$_2$)(OH)SiO$_{1.0}$)$_3$]$_{\Sigma 7}$ as a white solid. Selected characterization data: $^{29}$Si{$^1$H} NMR (99.3 MHz, C$_6$D$_6$, 25° C.) δ=−56.4, −64.8, 65.9 (3:1:3 MS (ESI, 100% MeOH): m/e: 595 (M+H$^+$, 100%); 617 (M+Na$^+$, 60%).

Preparation [((CH$_3$)SiO$_{1.5}$)$_4$((CH$_3$)(OH)SiO$_{1.0}$)$_3$]$_{\Sigma 7}$ from [((CH$_3$)SiO$_{1.5}$)$_8$]$_{\Sigma 8}$: A THP (350 mL) suspension of [((CH$_3$)SiO$_{1.5}$)$_8$]$_{\Sigma 8}$ (8.5 g, 15.83 mmol) was added an aqueous solution of Et$_4$NOH (35%, 6.51 mL, 15.83 mmol) at room temperature. After addition the resulting mixture was stirred at the same temperature for 20 h. The mixture was neutralized with 1N HCl solution and extracted with diethyl ether. The organic layer was washed with brine, dried over MgSO$_4$. Evaporation of the volatiles gave a white oil-like solid. Recrystallization of the white solid from a mixed solvent (MeOH/H$_2$O=2.5/1) afforded [((CH$_3$)SiO$_{1.5}$)$_4$((CH$_3$)(OH)SiO$_{1.0}$)$_3$]$_{\Sigma 7}$ (1.35 g, 2.72 mmol) as a white powder in 17% yield. $^1$H NMR (CDCl$_3$) δ0.13 (s, 9H), 0.14 (s, 3H), 0.15 (s, 9H), 6.11(s, 3H). $^{13}$C NMR (CDCl$_3$) δ −4.50, −4.35. $^{29}$Si NMR (CDCl$_3$) δ−65.70, −65.16, −55.84. Calcd for C$_7$H$_{24}$O$_{12}$Si$_7$: C, 16.92; H, 4.87. Found: C, 17.16; H, 4.89. MS (ESI, 100% MeOH): m/e: 496.96 (M+H$^+$, 100%); 518.86 (M+Na$^+$, 75%).

Preparation [((c-C$_6$H$_{11}$)SiO$_{1.5}$)$_4$((c-C$_6$H$_{11}$)(OH)SiO$_{1.0}$)$_3$]$_{\Sigma 7}$ from [((c-C$_6$H$_{11}$)SiO$_{1.5}$)$_7$((H)SiO$_{1.0}$)$_1$]$_{\Sigma 8}$: A solution of [((c-C$_6$H$_{11}$)SiO$_{1.5}$)$_7$((H)SiO$_{1.0}$)$_1$]$_{\Sigma 8}$ (460 mg, 0.46 mmol) and 35% aqueous NEt$_4$OH (0.2 mL, 0.49 mmol) was refluxed in THF (5 mL) for 5 h then neutralized with dilute aqueous HCl. Evaporation of the volatiles afforded a white solid, which was dissolved in Et$_2$O and dried over anhydrous MgSO$_4$. Filtration and evaporation of the solvent afforded a white microcrystalline solid in high yield. Analysis of the product mixture by $^{29}$Si NMR spectroscopy indicated that the major product was [((c-C$_6$H$_{11}$)SiO$_{1.5}$)$_4$((c-C$_6$H$_{11}$)(OH)SiO$_{1.0}$)$_3$]$_{\Sigma 7}$; small amounts of [((c-C$_6$H$_{11}$)SiO$_{1.5}$)]$_{\Sigma 8}$ were also present.

Preparation [((c-C$_5$H$_9$)SiO$_{1.5}$)$_4$((c-C$_5$H$_9$)(OH)SiO$_{1.0}$)$_2$]$_{\Sigma 8}$ from [(c-C$_5$H$_9$)SiO$_{1.5}$]$_{\Sigma 8}$: A 12-L reactor equipped with a mechanical stirrer, addition pump and drying tube, was charged with 443.4 g (457.2 mmol) [(c-C$_5$H$_9$)SiO$_{1.5}$]$_{\Sigma 8}$ and 6.0 L THF. A base solution of Me$_4$NOH (in MeOH., 25 wt %, 212 mL) and THF (1.4 L) was prepared and added slowly to the reaction mixture and this mixture was stirred for 3 hours. Upon completion of the reaction a mechanically stirred quench tank was charged with 65 mL conc. HCl and 500 mL water was cooled to 0° C. and the above reaction mixture was quenched. Evaporation and filtration of the resulting mixture gave [((c-C$_5$H$_9$)SiO$_{1.5}$)$_4$((c-C$_5$H$_9$)(OH)SiO$_{1.0}$)$_2$]$_{\Sigma 8}$ to produce 364 g (81%) of white solids at 98% purity. $^1$H NMR (CDCl$_3$): 4.63 (2H, 2×OH, bs); 1.72 (16H, 8×CH$_2$, m); 1.56(16H, 8×CH$_2$, m); 1.46(32H, 16×CH$_2$, m); 0.94 (8H, 8×CH, m). {$^1$H}$^{13}$C NMR (CDCl$_3$): 27.41; 27.39; 27.36; 27.20; 27.06; 27.02; 27.00; 26.99; 22.88; 22.66; 22.16. Variations of this preparative method can be used to design both continuous and batch processes.

Although the present invention has been described above in terms of specific embodiments, it is anticipated that alterations and modifications thereof will no doubt become apparent to those skilled in the art. It is therefore intended that the following claims be interpreted as covering all such alterations and modifications as fall within the true spirit and scope of the invention.

What is claimed is:

1. A process of converting a polymeric silsesquioxane into a POSS fragment, comprising:

mixing an effective amount of a base with the polymeric silsesquioxane in a solvent to produce a basic reaction mixture, the base reacting with the polymeric silsesquioxane to produce the POSS fragment, wherein the polymeric silsesquioxane has the formula [RSiO$_{1.5}$]$_\infty$, and the POSS fragment has the formula [(RSiO$_{1.5}$)$_m$(RXSiO$_{1.0}$)$_n$], where R represents an organic substituent, X represents a functionality substituent, ∞ represents the degree of polymerization and is a number greater than or equal to 1, and m and n represent the stoichiometry of the formula.

2. The process of claim 1, wherein the base and the polymeric silsesquioxane are mixed by stirring the reaction mixture.

3. The process of claim 1, further comprising the steps of:
heating the reaction mixture to reflux; and
cooling the reaction mixture to room temperature.

4. The process of claim 3, further comprising isolating the POSS fragment.

5. The process of claim 4, wherein the POSS fragment is isolated by distillation, filtration, evaporation, decantation, crystallization, pressure reduction, or extraction, or a combination thereof.

6. The process of claim 5, further comprising the step of purifying the isolated POSS fragment through washing with water.

7. The process of claim 1, wherein the base cleaves at least one silicon-oxygen-silicon (Si—O—Si) bond in the polymeric silsesquioxane to promote the conversion of the polymeric silsesquioxane into the POSS fragment.

8. The process of claim 7, wherein the base is selected from the group consisting of hydroxide, organic alkoxides, carboxylates, amides, carboxamides, carbanions, carbonate, sulfate, phosphate, biphosphate, phosphorus ylides, nitrate, borate, cyanate, fluoride, hypochlorite, silicate, stannate, $Al_2O_3$, CaO, and ZnO, amines, amine oxides, lithium organometallics, zinc organometallics, and magnesium organometallics.

9. The process of claim 1, wherein a mixture of different bases is used.

10. The process of claim 1, further comprising mixing a co-reagent with the base and the polymeric silsesquioxane in the solvent.

11. The process of claim 10, wherein the co-reagent is selected from the group consisting of common Grignard reagents, alkalihalides, zinc compounds comprising $ZnI_2$, $ZnBr_2$, $ZnCl_2$, and $ZnF_2$, aluminum compounds comprising $Al_2H_6$, $LiAlH_4$, $AlI_3$, $AlBr_3$, $AlCl_3$, and $AlF_3$, and boron compounds comprising dihydroxy-organoborons, $BI_3$, $BBr_3$, $BCl_3$, and $BF_3$.

12. A process of converting a plurality of POSS fragments into a POSS compound, comprising:
mixing an effective amount of a base with the plurality of POSS fragments in a solvent to produce a basic reaction mixture, the base reacting with the POSS fragments to produce the POSS compound,
wherein the POSS fragments have the formula $(RSiO_{1.5})_m(RXSiO_{1.0})_n$ and contain from 1 to 7 silicon atoms and no more than 3 rings, and the POSS compound is selected from the group consisting of homoleptic nanostructure compounds having the formula $[(RSiO_{1.5})_n]_{\Sigma\#}$, heteroleptic nanostructure compounds having the formula $[(RSiO_{1.5})_m(R'SiO_{1.5})_n]_{\Sigma\#}$, functionalized homoleptic nanostructure compounds having the formula $[(RSiO_{1.5})_m(RXSiO_{1.0})_n]_{\Sigma\#}$, functionalized heteroleptic nanostructure compounds having the formula $[(RSiO_{1.5})_m(R'SiO_{1.5})_n(RXSiO_{1.0})_p]_{\Sigma\#}$ and expanded POSS fragments having the formula $(RSiO_{1.0})_m(RXSiO_{1.0})_n$, where R and R' each represents an organic substituent, X represents a functionality substituent, m, n and p represent the stoichiometry of the formula, $\Sigma$ indicates nanostructure, and # represents the number of silicon atoms contained within the nanostructure.

13. The process of claim 12, wherein the base and the POSS fragments are mixed by stirring the reaction mixture.

14. The process of claim 12, further comprising the steps of:
heating the reaction mixture to reflux; and
cooling the reaction mixture to room temperature.

15. The process of claim 14, further comprising:
isolating the POSS compound.

16. The process of claim 15 wherein the POSS compound is isolated by distillation, filtration, evaporation, decantation, crystallization, pressure reduction, or extraction, or a combination thereof.

17. The process of claim 16, further comprising the step of purifying the isolated POSS compound through washing with water.

18. The process of claim 12, wherein the base cleaves at least one silicon-oxygen-silicon (Si—O—Si) bond in the POSS fragments to promote the conversion of the POSS fragments into the POSS compound.

19. The process of claim 18, wherein the base is selected from the group consisting of hydroxide, organic alkoxides, carboxylates, amides, carboxamides, carbanions, carbonate, sulfate, phosphate, biphosphate, phosphorus ylides, nitrate, borate, cyanate, fluoride, hypochlorite, silicate, stannate, $Al_2O_3$, CaO, and ZnO, amines, amine oxides, lithium organometallics, zinc organometallics, and magnesium organometallics.

20. The process of claim 19, wherein the concentration of the base is between 1–10 equivalents per mole of silicon present in the reaction mixture.

21. The process of claim 20, wherein the concentration of the hydroxide base is between 1–2 equivalents per mole of silicon present in the reaction mixture.

22. The process of claim 12, wherein a mixture of different bases is used.

23. The process of claim 12, further comprising mixing a co-reagent with the base and the plurality of POSS fragments in the solvent.

24. The process of claim 13, wherein the co-reagent is selected from the group consisting of common Grignard reagents, alkalihalides, zinc compounds comprising $ZnI_2$, $ZnBr_2$, $ZnCl_2$, and $ZnF_2$, aluminum compounds comprising $Al_2H_6$, $LiAlH_4$, $AlI_3$, $AlBr_3$, $AlCl_3$, and $AlF_3$, and boron compounds comprising dihydroxy-organoborons, $BI_3$, $BBr_3$, $BCl_3$, and $BF_3$.

25. A process of converting a first functionalized POSS nanostructure compound into a second functionalized POSS nanostructure compound that is different than the first functionalized POSS nanostructure compound, comprising:
mixing an effective amount of a base with the first functionalized POSS nanostructure compound in a solvent to produce a basic reaction mixture, the base reacting with the first functionalized POSS nanostructure compound to produce the second POSS nanostructure compound,
wherein the first and second POSS nanostructure compounds are each selected from the group consisting of homoleptic nanostructure compounds having the formula $[(RSiO_{1.5})_n]_{\Sigma\#}$, heteroleptic nanostructure compounds having the formula $[(RSiO_{1.5})_m(R'SiO_{1.5})_n]_{\Sigma\#}$, functionalized homoleptic nanostructure compounds having the formula $[(RSiO_{1.5})_m(RXSiO_{1.0})_n]_{\Sigma\#}$, and functionalized heteroleptic nanostructure compounds having the formula $[(RSiO_{1.5})_m(R'SiO_{1.5})_n(RXSiO_{1.0})_p]_{\Sigma\#}$, where R and R' each represents an organic substituent, X represents a functionality substituent, m, n and p represent the stoichiometry of the formula, $\Sigma$ indicates nanostructure, and # represents the number of silicon atoms contained within the nanostructure.

26. The process of claim 25, wherein the second functionalized POSS nanostructure compound has more functionalities X than the first functionalized POSS nanostructure compound but the two functionalized POSS nanostructure compounds have the same number of silicon atoms.

27. The process of claim 25, wherein the base and the first functionalized POSS nanostructure compound are mixed by stirring the reaction mixture.

28. The process of claim 27, further comprising the steps of:
heating the reaction mixture to reflux; and
cooling the reaction mixture to room temperature.

29. The process of claim 28, further comprising:
isolating the second functionalized POSS nanostructure compound.

30. The process of claim 29, wherein the second functionalized POSS nanostructure compound is isolated by distillation, filtration, evaporation, decantation, crystallization, pressure reduction, or extraction, or a combination thereof.

31. The process of claim 30, further comprising the step of purifying the isolated POSS nanostructure compound through washing with water.

32. The process of claim 25, wherein the base cleaves at least one silicon-oxygen-silicon (Si—O—Si) bond in the first functionalized POSS nanostructure compound to promote the conversion of the first functionalized POSS nanostructure compound into the second functionalized POSS nanostructure compound.

33. The process of claim 32, wherein the base is selected from the group consisting of hydroxide, organic alkoxides, carboxylates, amides, carboxamides, carbanions, carbonate, sulfate, phosphate, biphosphate, phosphorus ylides, nitrate, borate, cyanate, fluoride, hypochlorite, silicate, stannate, $Al_2O_3$, CaO, and ZnO, amines, amine oxides, lithium organometallics, zinc organometallics.

34. The process of claim 33, wherein the base is a hydroxide and the concentration of the hydroxide base is between 1–10 equivalents per mole of silicon present in the reaction mixture.

35. The process of 34, wherein the concentration of the hydroxide base is between 2–5 equivalents per mole of silicon present in the reaction mixture.

36. The process of claim 25, wherein a mixture of different bases is used.

37. The process of claim 25, further comprising mixing a co-reagent with the base and the first functionalized POSS nanostructure compound in the solvent.

38. The process of claim 37, wherein the co-reagent is selected from the group consisting of common Grignard reagents, alkalihalides, zinc compounds comprising $ZnI_2$, $ZnBr_2$, $ZnCl_2$, and $ZnF_2$, aluminum compounds comprising $Al_2H_6$, $LiAlH_4$, $AlI_3$, $AlBr_3$, $AlCl_3$, and $AlF_3$, and boron compounds comprising dihydroxy-organoborons.

39. A process of converting an unfunctionalized POSS nanostructure compound into a functionalized POSS nanostructure compound, comprising:
mixing an effective amount of a base with the unfunctionalized POSS nanostructure compound in a solvent to produce a basic reaction mixture, the base reacting with the unfunctionalized POSS nanostructure compound to produce the functionalized POSS nanostructure compound,
wherein the unfunctionalized POSS nanostructure compound is selected from the group consisting of homoleptic nanostructure compounds having the formula $[(RSiO_{1.5})_n]_{\Sigma\#}$ and heteroleptic nanostructure compounds having the formula $[(RSiO_{1.5})_m(R'SiO_{1.5})_n]_{\Sigma\#}$, and the functionalized POSS nanostructure compound is selected from the group consisting of functionalized homoleptic nanostructure compounds having the formula $[(RSiO_{1.5})_m(RXSiO_{1.0})_n]_{\Sigma\#}$ and functionalized heteroleptic nanostructure compounds having the formula $[(RSiO_{1.5})_m(R'SiO_{1.5})_n(RXSiO_{1.0})_p]_{\Sigma\#}$, where R and R' each represents an organic substituent, X represents a functionality substituent, m, n and p represent the stoichiometry of the formula, $\Sigma$ indicates nanostructure, and # represents the number of silicon atoms contained within the nanostructure.

40. The process of claim 39, wherein the base and the unfunctionalized POSS nanostructure compound are mixed by stirring the reaction mixture.

41. The process of claim 39, further comprising the steps of:
heating the reaction mixture to reflux; and
cooling the reaction mixture to room temperature.

42. The process of claim 41, further comprising:
isolating the functionalized POSS nanostructure compound.

43. The process of claim 42, wherein the functionalized POSS nanostructure compound is isolated by distillation, filtration, evaporation, decantation, crystallization, pressure reduction, or extraction, or a combination thereof.

44. The process of claim 43, further comprising the step of purifying the isolated functionalized POSS nanostructure compound through washing with water.

45. The process of claim 39, wherein the base cleaves at least one silicon-oxygen-silicon (Si—O—Si) bond in the unfunctionalized POSS nanostructure compound to promote the conversion of the polymeric silsesquioxane into the functionalized POSS nanostructure compound.

46. The process of claim 45, wherein the base is selected from the group consisting of hydroxide, organic alkoxides, carboxylates, amides, carboxamides, carbanions, carbonate, sulfate, phosphate, biphosphate, phosphorus ylides, nitrate, borate, cyanate, fluoride, hypochlorite, silicate, stannate, $Al_2O_3$, CaO, and ZnO, amines, amine oxides, lithium organometallics, zinc organometallics, and magnesium organometallics.

47. The process of claim 46, wherein the base is a hydroxide and the concentration of the hydroxide base is between 1–10 equivalents per mole of silicon present in the reaction mixture.

48. The process of claim 46, wherein the concentration of the hydroxide base is between 2–5 equivalents per mole of silicon present in the reaction mixture.

49. The process of claim 48, wherein a mixture of different bases is used.

50. The process of claim 39, further comprising mixing a co-reagent with the base and the unfunctionalized POSS nanostructure compound in the solvent.

51. The process of claim 50, wherein the co-reagent is selected from the group consisting of common Grignard reagents, alkalihalides, zinc compounds comprising $ZnI_2$, $ZnBr_2$, $ZnCl_2$, and $ZnF_2$, aluminum compounds comprising $Al_2H_6$, $LiAlH_4$, $AlI_3$, $AlBr_3$, $AlCl_3$, and $AlF_3$, and boron compounds comprising dihydroxy-organoborons, $BI_3$, $BBr_3$, $BCl_3$, and $BF_3$.

52. A process of converting a polymeric silsesquioxane into a POSS nanostructure compound, comprising:
mixing an effective amount of a base with the polymeric silsesquioxane in a solvent to produce a basic reaction mixture, the base reacting with the polymeric silsesquioxane to produce the POSS nanostructure compound, wherein the polymeric silsesquioxane has the formula $[RSiO_{1.5}]_\infty$, and the POSS nanostructure compound is $[(RSiO_{1.5})_4(RXSiO_{1.0})_3]_{\Sigma 7}$, where R represents an organic substituent, X represents a functionality substituent, $\infty$ represents the degree of polymerization and is a number greater than or equal to 1, and $\Sigma$ indicates nanostructure.

53. The process of claim 12, wherein the POSS compound is $[(RSiO_{1.5})_4(RXSiO_{1.0})_1]_{\Sigma 7}$.

54. The process of claim 25, wherein the second functionalized POSS nanostructure compound is $[(RSiO_{1.5})_4(RXSiO_{1.0})_3]_{\Sigma 7}$.

55. The process of claim 39, wherein the functionalized POSS nanostructure compound is $[(RSiO_{1.5})_4(RXSiO_{1.0})_3]_{\Sigma 7}$.

\* \* \* \* \*